US007926992B2

(12) United States Patent
Kim et al.

(10) Patent No.: US 7,926,992 B2
(45) Date of Patent: Apr. 19, 2011

(54) LAMP SHIELD DRIVING DEVICE AND HEADLAMP ASSEMBLY INCLUDING THE SAME

(75) Inventors: Jong-Un Kim, Gyeongsan (KR); Chang-Hwan Oh, Gyeongsan (KR)

(73) Assignees: SL Seobong, Cheonan (KR); SL Lighting, Daegu (KR)

( * ) Notice: Subject to any disclaimer, the term of this patent is extended or adjusted under 35 U.S.C. 154(b) by 179 days.

(21) Appl. No.: 12/258,557

(22) Filed: Oct. 27, 2008

(65) Prior Publication Data

US 2009/0109697 A1 Apr. 30, 2009

(30) Foreign Application Priority Data

Oct. 26, 2007 (KR) ........................ 10-2007-0108406

(51) Int. Cl.
*B60Q 1/04* (2006.01)

(52) U.S. Cl. ......................... 362/539; 362/283; 362/513

(58) Field of Classification Search .................. 362/282, 362/283, 284, 319, 322, 324, 509, 512, 513, 362/538, 539
See application file for complete search history.

(56) References Cited

U.S. PATENT DOCUMENTS

| | | | | |
|---|---|---|---|---|
| 5,339,226 | A * | 8/1994 | Ishikawa | 362/282 |
| 7,201,505 | B2 * | 4/2007 | Sugimoto et al. | 362/539 |
| 7,290,907 | B2 * | 11/2007 | Kovach | 362/283 |
| 2002/0122310 | A1 * | 9/2002 | DiPenti et al. | 362/512 |
| 2003/0021119 | A1 * | 1/2003 | Blusseau et al. | 362/512 |

FOREIGN PATENT DOCUMENTS

JP 2005-259473 9/2005

* cited by examiner

*Primary Examiner* — Y My Quach Lee

(74) *Attorney, Agent, or Firm* — Edwards Angell Palmer & Dodge LLP; Kongsik Kim

(57) ABSTRACT

A headlamp assembly for providing various beam patterns for a vehicle is provided, which includes a lamp shield driving device. The device comprises a first shield including at least one shield projection formed on a circumference thereof, a second shield to shield at least a part of beam irradiation in a close range, and a shield driving unit to drive the first shield and the second shield in a sequential order to thereby generate a certain beam pattern.

15 Claims, 28 Drawing Sheets

LAMP SHIELD DRIVING DEVICE AND HEADLAMP ASSEMBLY INCLUDING THE SAME

CROSS-REFERENCE TO RELATED APPLICATION

This application is based on and claims priority from Korean Patent Application No. 10-2007-0108406, filed on Oct. 26, 2007, the disclosure of which is incorporated herein in its entirety by reference.

BACKGROUND

1. Technical Field

The present invention relates to a headlamp for a vehicle, and more particularly to a headlamp assembly capable of generating a plurality of beam patterns according to various traveling environments.

2. Background Art

In general, a vehicle includes a lighting device that illuminates objects in front of the vehicle and notifies drivers of other vehicles or pedestrians of a traveling state of the vehicle. A headlight or headlamp is a lighting lamp illuminating a forward traveling course of a vehicle, and is necessary to allow a driver to see an obstacle on a road ahead of the vehicle in a certain distance (e.g., 100 meters). The standard of such a headlamp is differently set for each country. In particular, an irradiating direction of the beam emitting from the headlamp varies depending upon the right-side traffic (left-side driving) and left-side traffic (right-side driving).

A conventional headlamp for a vehicle provides a driver with a stationary illumination pattern, irrespective of the circumstances of roads. Consequently, it is not possible to secure a proper visual field so that a driver can drive a vehicle safely during high speed traveling that requires to secure a visual field in a long range in comparison with a normal visual field, traveling in a downtown area that relatively lowers the dependency of the brightness of the headlamp due to the peripheral illumination that is relatively higher than that on other roads, or traveling under nasty weather which increases dazzling due to the light reflection by wet roads and decreases a visual field.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

One of the objects of the present invention is to provide a lamp shield driving device and an adaptive headlamp assembly including the same which allow a plurality of beam patterns suitable for various traveling environments to be generated in an efficient way.

In one aspect, the present invention provides a lamp shield driving device for an adaptive headlamp assembly to generate a plurality of beam patterns, which comprises a first shield, a second shield, and a shield driving unit. The a first shield may include at least one shield projection formed on a circumference thereof. The second shield is provided to shield at least a part of beam irradiation. The shield driving unit is provided to drive the first shield and the second shield in a sequential order to thereby generate a certain beam pattern. In this case, the shield driving unit includes driving means for supplying a driving force, and a drive gear part to transmit the driving force to the first shield and the second shield.

In another aspect, the present invention provides an adaptive headlamp assembly including the lamp shield driving device It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and additional objects, advantages, and features of the invention will be set forth in part in the description which follows and in part will become apparent to those having ordinary skill in the art upon examination of the following or may be learned from practice of the invention.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE DISCLOSURE

Figure 1:
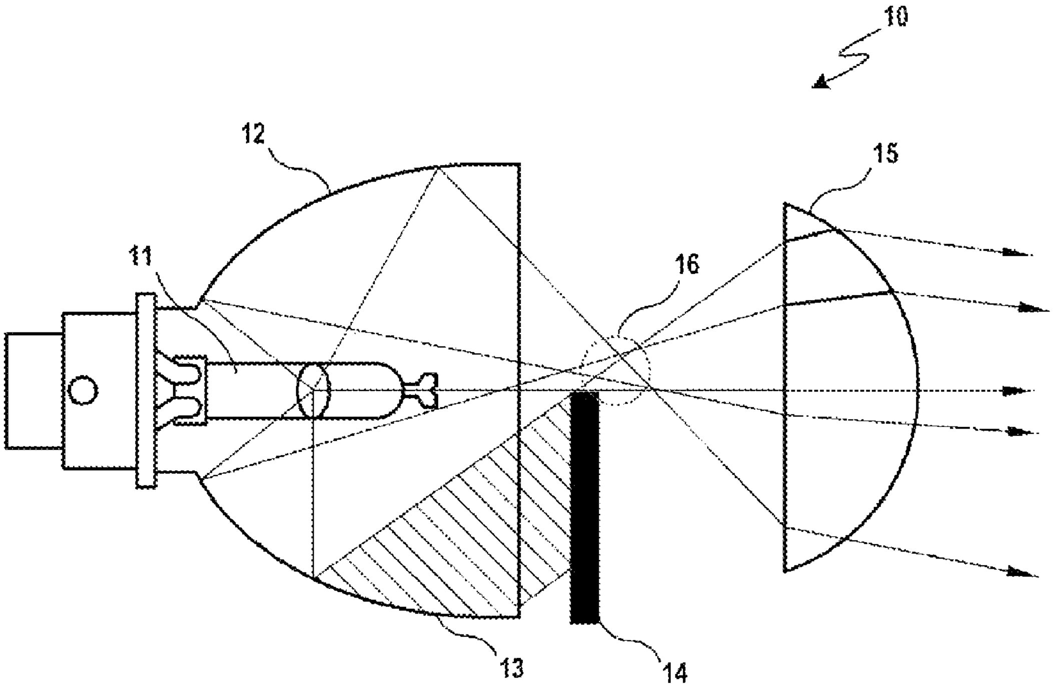
FIG. 1 is a view schematically illustrating the construction of a headlamp of projection type.

Hereinafter, preferred embodiments of the present invention will be described in detail with reference to the accompanying drawings. The aspects and features of the present invention and methods for achieving the aspects and features will be apparent by referring to the embodiments to be described in detail with reference to the accompanying drawings. However, the present invention is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the invention, and the present invention is only defined within the scope of the appended claims. In the entire description of the present invention, the same drawing reference numerals are used for the same elements across various figures.

FIG. 1 is a view schematically illustrating the construction of a projection-type headlamp 10. Since such a projection-type headlamp possesses a characteristic of focusing light on one point, it is superior to a clear-type headlamp in terms of light distribution, and gives a front design of a vehicle with a sporty appearance.

Light emitted from a light emitting lamp 11 is reflected by a mirror surface 12 of a certain shape, and then is focused on one point 16 in front of the lamp 11. The focused light is refracted by a refraction lens 15 provided ahead of the lamp to radiate in a forward direction. Upwardly emitted light among the emitted light is reflected by the mirror surface 12 to progress in a downward direction, and then the downwardly emitted light is reflected by a mirror surface 13 to proceed in an upward direction. Except for the case of high beam, the light that is downwardly emitted and then proceeds upwardly is shielded by a shield 14, thereby reducing or preventing inflicting glare on drivers of oncoming vehicles.

The projection-type headlamp 10 focuses the light reflected by the mirror surface 12 on one point 16, unlike clear-type headlamps. Consequently, the headlamp 10 can form various patterns of beam irradiation by changing the shape of the shield around the point 16.

Figure 2:
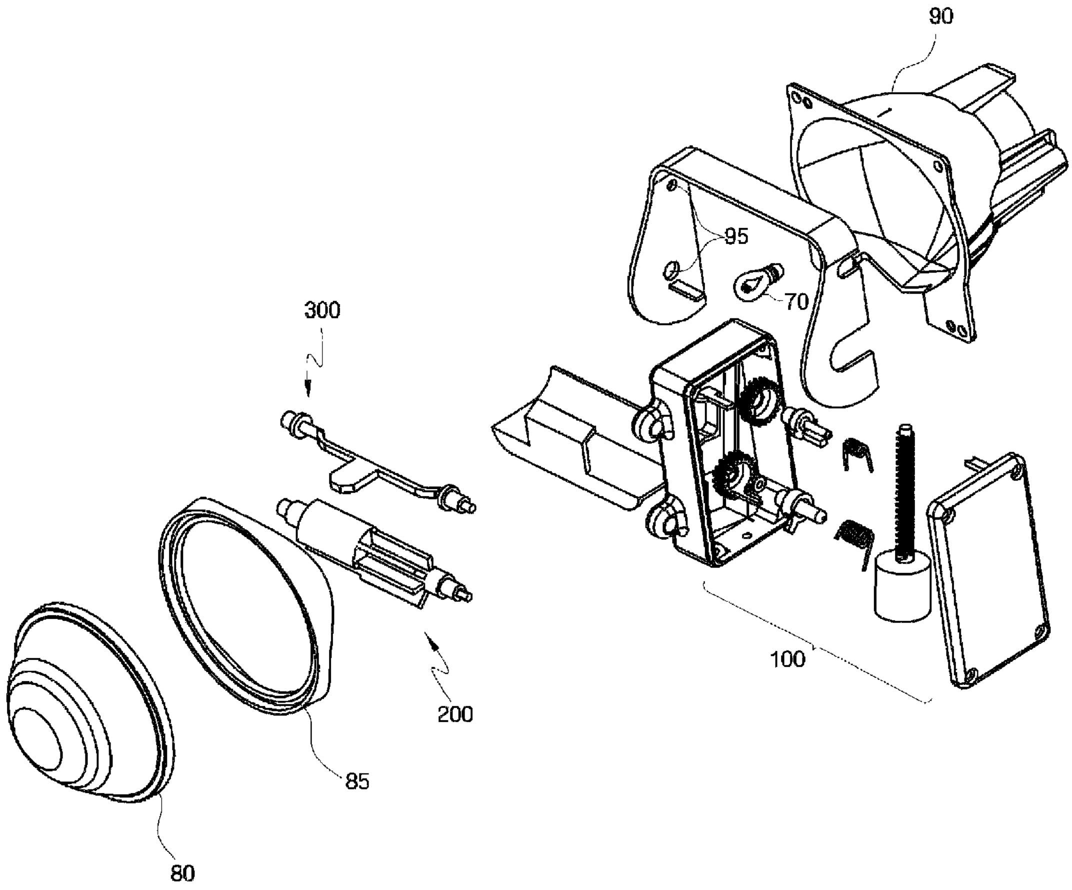
FIG. 2 is an exploded perspective view illustrating an adaptive headlamp assembly according to an embodiment of the present invention.
Figure 3:
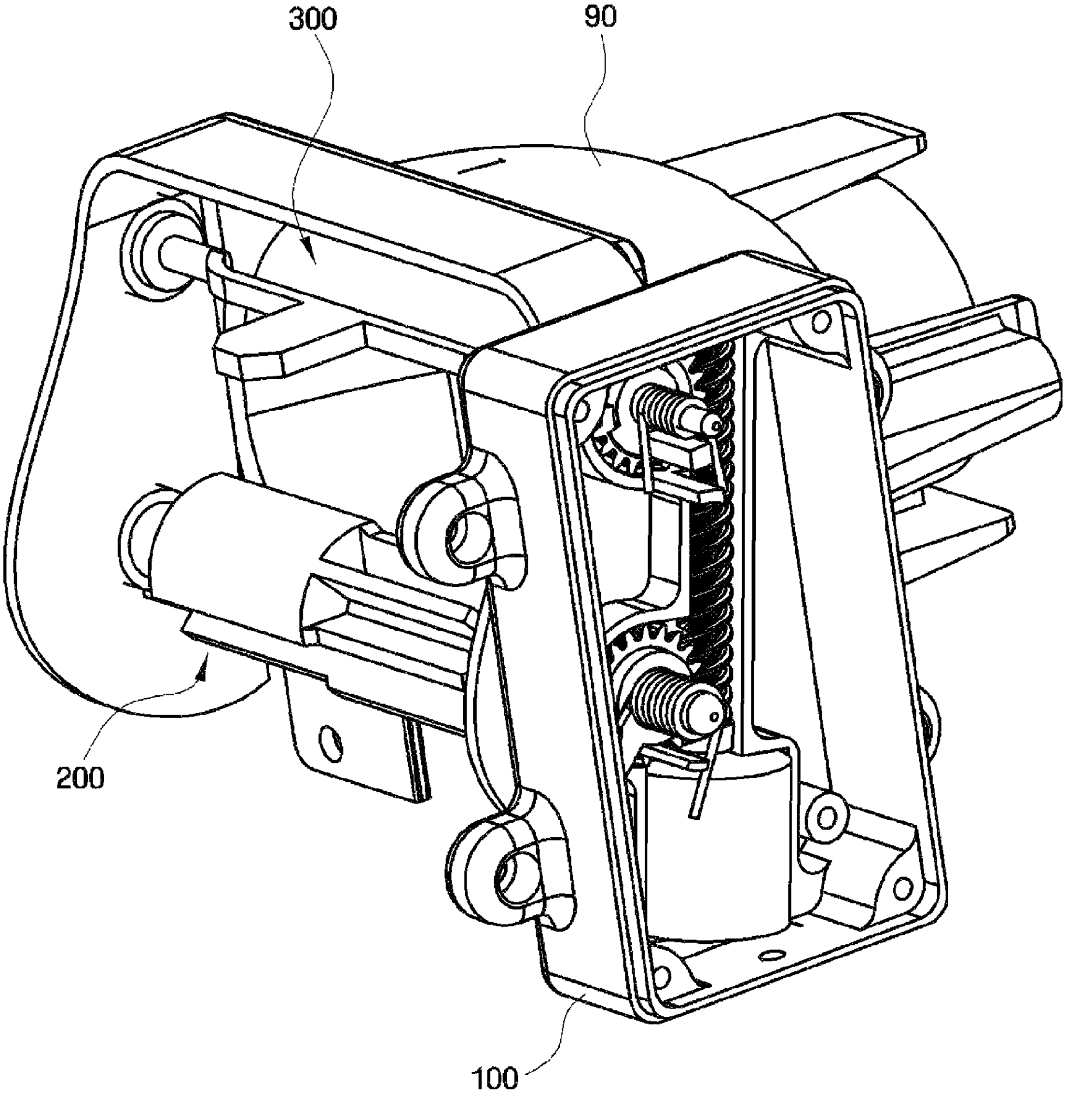
FIG. 3 is a perspective view illustrating an adaptive headlamp assembly according to an embodiment of the present invention.

FIG. 2 is an exploded perspective view illustrating an adaptive headlamp assembly according to an embodiment of the present invention, and FIG. 3 is a perspective view of the adaptive headlamp assembly. In FIG. 3, a lens 80 shown in FIG. 2 is omitted in order to show an inner portion of the headlamp.

Referring to FIGS. 2 and 3, the adaptive headlamp assembly according an embodiment of the present invention includes a lamp 70, a lamp shield driving device 100, a lens 80 and a housing 90.

The lamp 70 functions as a light source. Various types of known light sources, such as an HID (High Intensity Discharge) lamp, a halogen lamp and an LED light source can be used.

The lamp shield driving device 100 is adapted to drive one or more shields so as to make light emitted from the lamp 70 in a certain beam pattern. According to an embodiment of the present invention, the lamp shield driving device 100 drives a first shield 200 and a second shield 300, as detailed below.

The lens 80 refracts the light that is emitted from the lamp 70, reflected by a refection surface (not shown) and then spread in a forward direction, thereby focusing the light in one direction and then irradiating the light in a forward direction. The lens 80 is attached to a lens holder 85 that is assembled to the housing 90 to form the outer appearance of the head lamp assembly.

The housing 90 is a body of the headlamp assembly. The lamp 70, the lamp shield driving device 100 and the lens 80 are assembled to the housing 90 to complete the headlamp assembly. The housing 90 may include a reflection plate enclosing a rear portion of the lamp so that the light emitted from the lamp proceeds in a forward direction. The housing 90 may further include a rotation support 95 for supporting a rotation shaft so that the first shield 200 and the second shield 300 can rotate around the rotation shaft.

Figure 4:
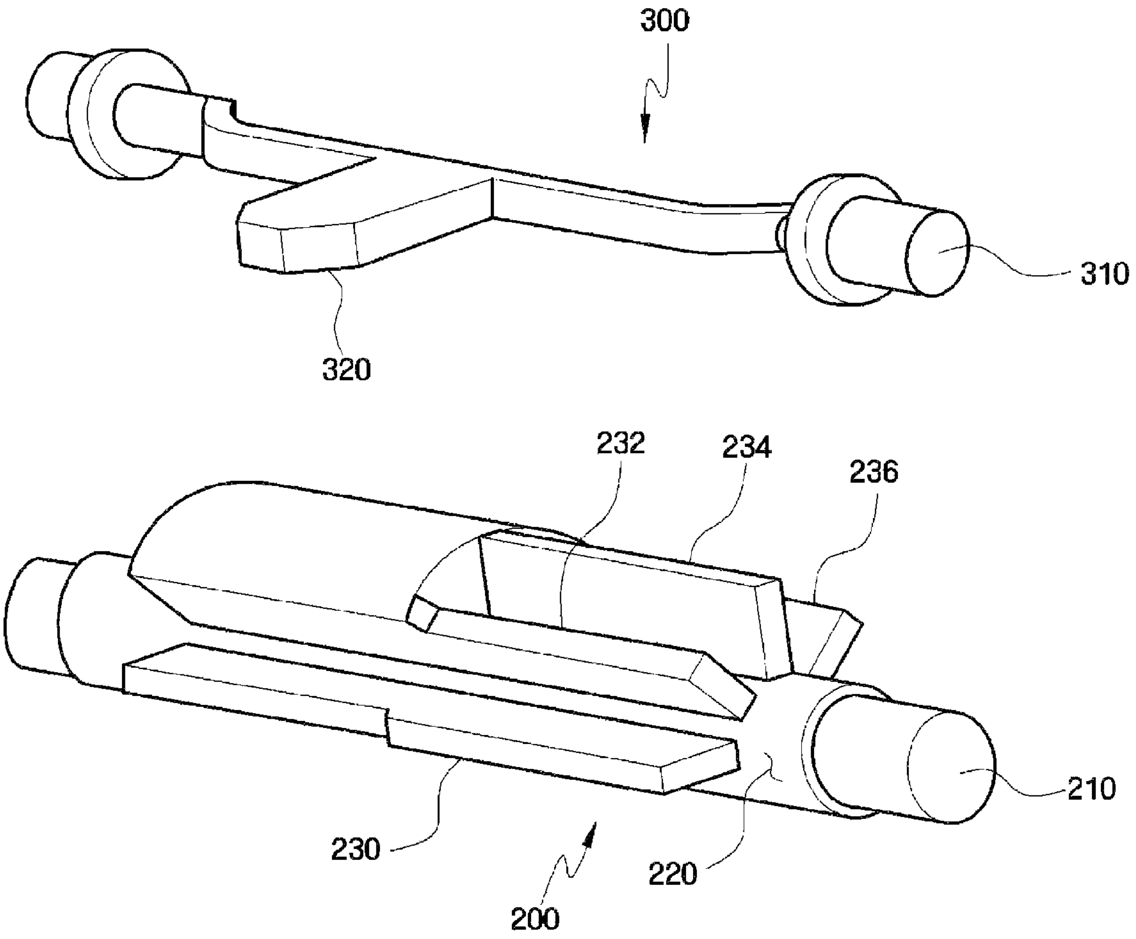
FIG. 4 is a perspective view illustrating the arrangement of a first shield and a second shield in a lamp shield driving device according to an embodiment of the present invention.

FIG. 4 is a perspective view of the first shield and the second shield driven by the lamp shield driving device according to the embodiment of the present invention.

Referring to FIG. 4, the first shield 200 and the second shield 300 may be positioned in parallel to rotation shafts 210 and 310, respectively. The first shield 200 and the second shield 300 are driven by the lamp shield driving device 100 in order to form a certain beam pattern.

The first shield 200 may be provided with at least one of shield projections 230, 232, 234 and 236 on a circumference 220 thereof. Although the first shield 200 is illustrated to be in a cylindrical form, the shape of the first shield 200 can be modified. The pattern of the shield projections also may be modified depending upon the beam pattern to be formed. In addition, the position of the respective shied projections can be modified. For example, the shield projections may positioned on a circumference of the first shield 200 while being separated at a predetermined angle or angles. Further, as shown in FIG. 4, portions of the shield projections may be formed into a unitary body.

The first shield 200 may be driven by a shield projection placed in the uppermost position over the rotation shaft 210. For example, the third shield projection 234, as shown in FIG. 4, is placed on a vertical line of the rotation shaft to form a beam pattern of class V. Otherwise, the first shield projection 230, the second shield projection 232 or the fourth shield projection 236 may be activated by rotating the first shield 200 around the rotation shaft 210, thereby driving the first shield 200. The term 'activation' herein means that the shield projection attached to the cylindrical circumference 220 is placed on the uppermost position of the vertical line to intercept a part of the light to be emitted in a forward direction.

That is, by rotating the first shield 200 around the rotation shaft 210, the shield projections 230, 232, 234 and 236 attached to the first shield 200 can be activated to change the beam pattern to be formed, which will be described in detail hereinafter.

The second shield 300 includes a shield plate 320 attached to the rotation shaft 310. Normally, the shield plate 320 is not vertically hanged down from the rotation shaft 310. For example, if the shield plate 320 is fixed in a horizontal direction, the light emitted from the lamp 70 is reflected by the reflection plate of the housing 90 to proceed in a forward direction. In this instance, the horizontally positioned shield plate 320 does not interfere with the forwardly emitted light, so that the light is irradiated on a road surface. The state where the shield plate 320 is placed in a horizontal direction or at a position above the horizontal direction not to interfere with at least a part of the forwardly emitted light is regarded as that the second shield 300 is not driven.

In the case where the headlamp dazzles driver's eye due to the road surface wet by rain, the shield plate 320 can be adjusted by rotating the second shield 300 so as to be vertically hanged down for decreasing the quantity of light in a close range. In this instance, the light reflected by the reflection plate to proceed in a forward direction is blocked by the shield plate 320 of the second shield 300, thereby lowering brightness of the light to be emitted in a forward direction.

FIGS. 5A to 5F are views showing examples of various beam irradiating patterns.

Figure 5A:
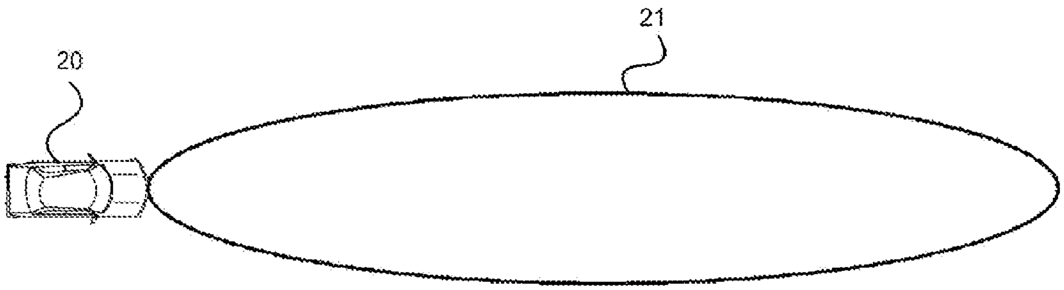
FIGS. 5A to 5F are views showing examples of various beam irradiating patterns.

FIG. 5A shows a beam pattern of class H. The class H beam pattern 21 regarded as a high beam which illuminates a long range and is suitable for the circumstances in which there are no vehicles in front of a vehicle 20 traveling at a high speed.

Figure 5B:
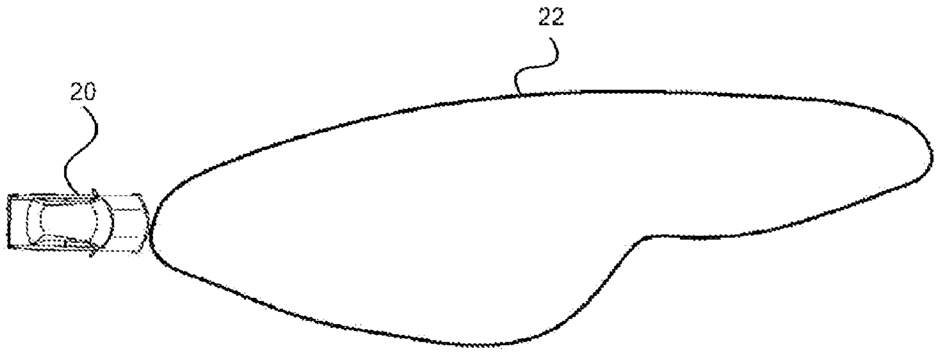

FIG. 5B shows a beam pattern of class RHD C. The class RHD C beam pattern 22 is used when traffic is changed from the right side to the left side with respect to the vehicle 20. Consequently, the beam pattern 22 is symmetrical with respect to a beam pattern 30 of class C in FIG. 5C.

Figure 5C:
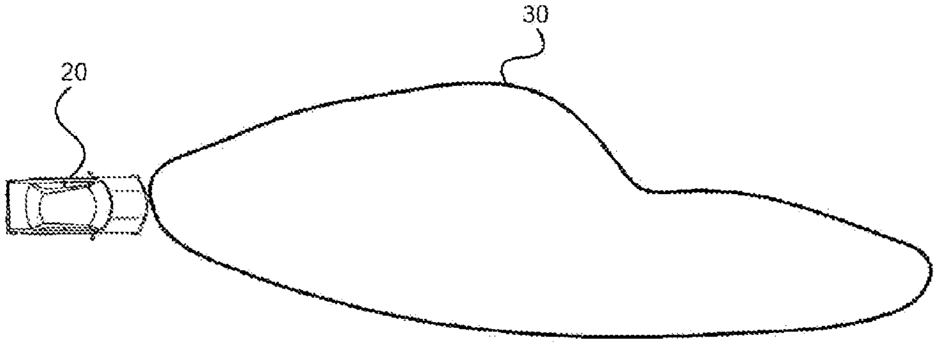

FIG. 5C shows a beam pattern of class C. The class C beam pattern 30 is suitable for the case where it does not need to apply the other beam patters. As compared with a low beam, it improves a pattern while securing a visual field of an opposite traffic road.

Figure 5D:
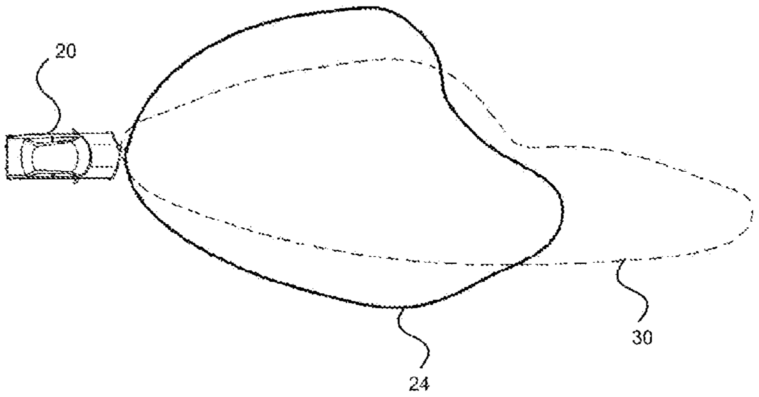

FIG. 5D shows a beam pattern of class V. The class V beam pattern 24 is suitable for the case, e.g., where the vehicle 20 travels under the environment securing brightness of peripheral illumination, such as an urban district. For example, when traveling on the urban district, a vehicle travels at speed of 60 km/h or less, and brightness of the road surface may be 1 cd/$m^2$ or higher. In particular, class V has a wider left/right visual field and a shorter (e.g., about 50 m to about 60 m in front of the vehicle) forward visual field than class C. Illumination directions of left and right headlamps can be slightly tilted outwardly so as to widen the left/right visual field.

Figure 5E:
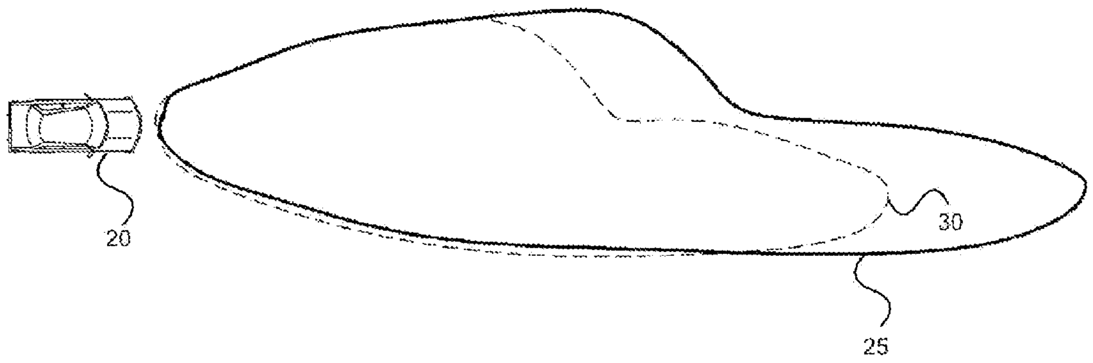

FIG. 5E shows a beam pattern of class E. The class E beam pattern 25 is suitable for the case, e.g., where the vehicle 20 travels on an express highway or roads having long straight ranges. Consequently, class E has a characteristic in that a forward visual field is relatively longer than class C.

Figure 5F:
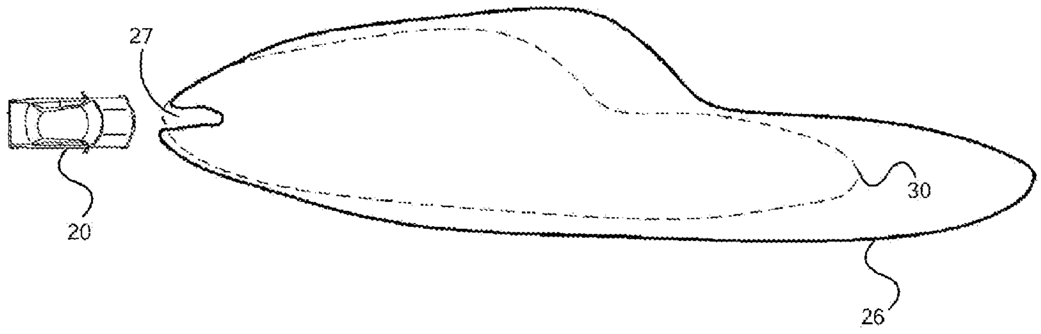

FIG. 5F shows a beam pattern of class W. The class W beam pattern 26 is suitable for the case, e.g., where the vehicle 20 travels in the rainy weather or on a wet road. Consequently, the forward visual field of class W is substantially similar to that of class C, but the amount of light is reduced at a close-forward area of the vehicle 20 (e.g., 10 to 20 m) so as to decrease reflective glare.

As shown in FIGS. 5A to 5F, it is necessary for the vehicle 20 to variably change the beam pattern depending upon various traveling environments. Variable beam patterns can be generated by rotating the shield or shields. For example, the beam patterns shown in FIGS. 5A to 5F can be generated by cooperatively or selectively driving the first shield 200 and the second shield 300 shown in FIG. 4.

FIGS. 6A to 6F are views illustrating the operation of the first shield and the second shield according to an embodiment of the present invention which corresponds to the beam patterns in FIGS. 5A to 5F, respectively.

Figure 6A:
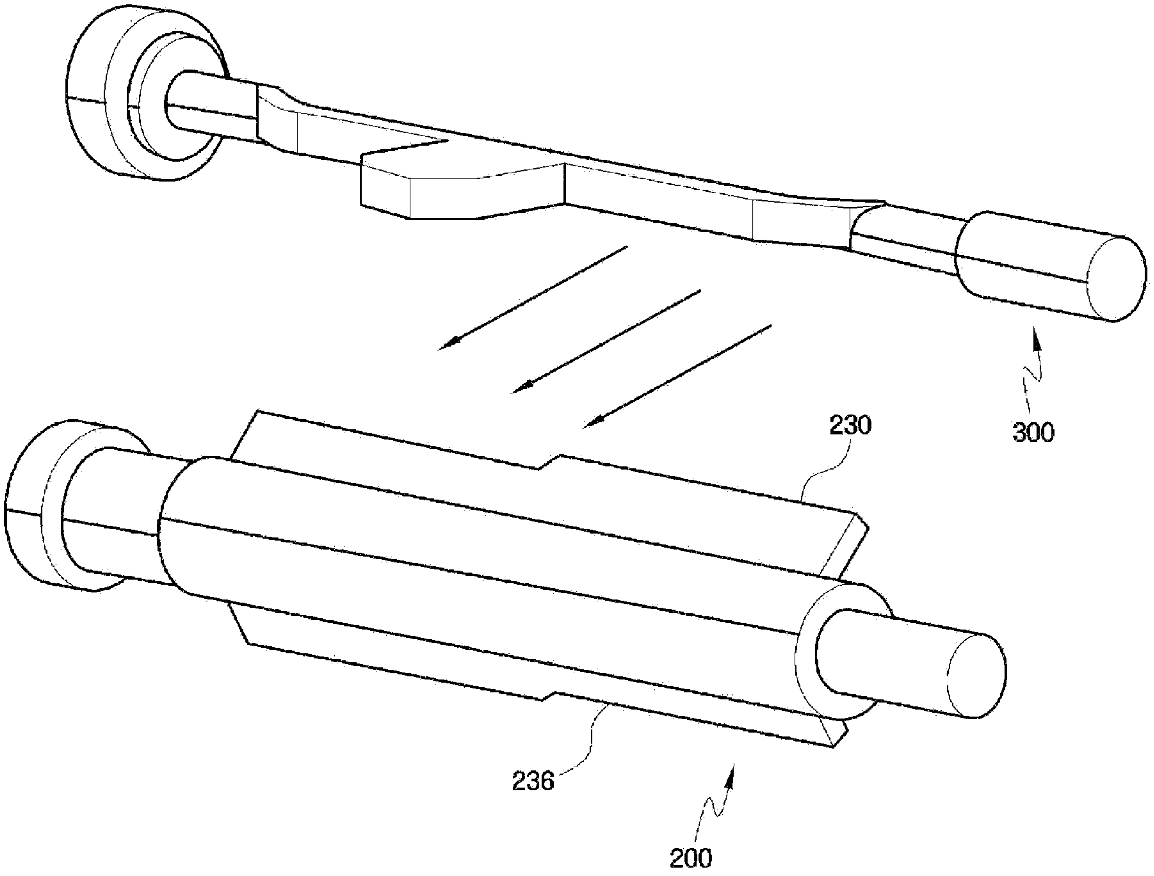
FIGS. 6A to 6F are views illustrating the arrangement of a first shield and a second shield according to an embodiment of the present invention which corresponds to the beam patterns in FIGS. 5A to 5F, respectively.

FIG. 6A shows the arrangement of the first shield 200 and the second shield 300 which generates the beam pattern of class H. The class H beam pattern is to generate a general high beam, in which any of the shield projections 230, 232, 234 and 236 of the first shield 200 is not activated, and the second shield 300 is horizontally positioned not to intercept the light. The light proceeding forwardly through the reflection plate is not blocked by the first shield 200 and the second shield 300 to generate the beam pattern of class H which irradiates in a long range.

Figure 6B:
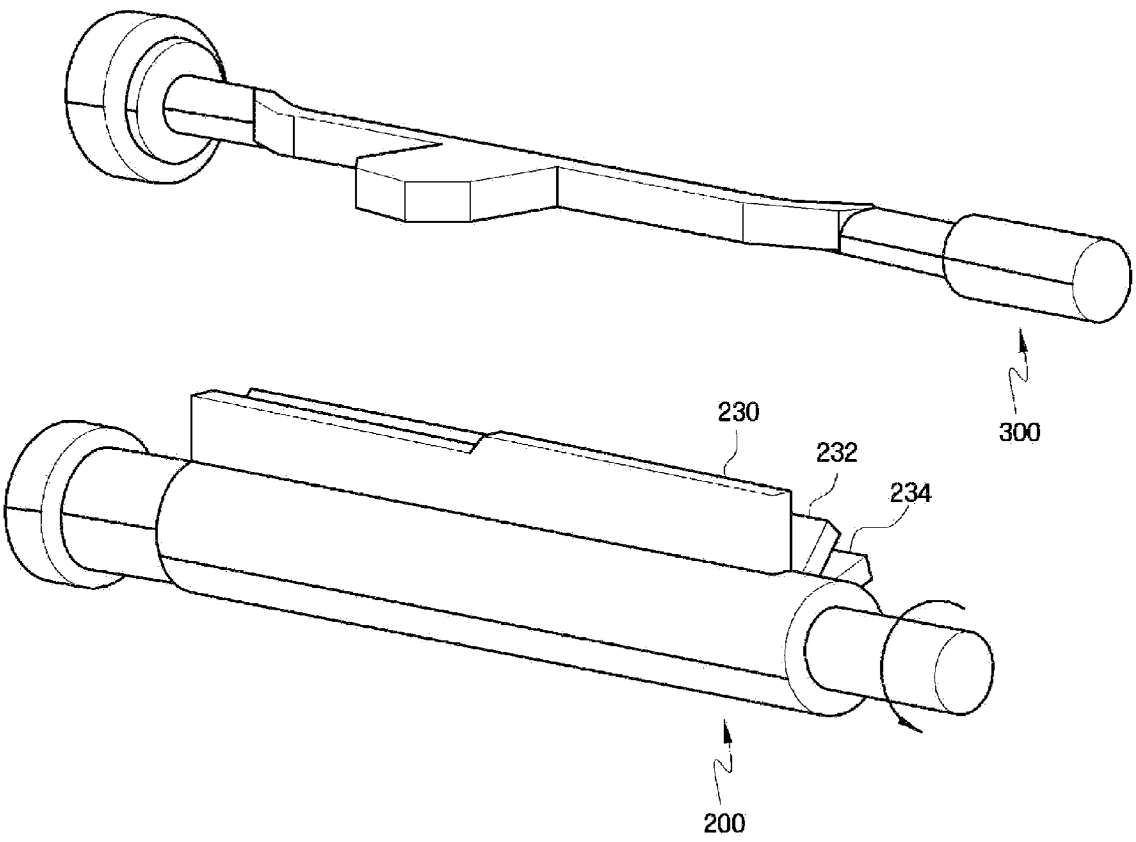

FIG. 6B shows the arrangement of the first shield 200 and the second shield 300 which generates the beam pattern of class RHD C. The beam pattern of class RHD C is generated by activating the first shield projection 230 of the first shield 200. The first shield projection 230 of the first shield 200 is activated by rotation of the first shield 200 so that the first shield projection 230 stands vertically. In this instance, the second shield 300 is not driven. Consequently, a part of the forwardly proceeding light is blocked by the first shield projection 230 to generate the beam pattern of class RHD C.

Figure 6C:
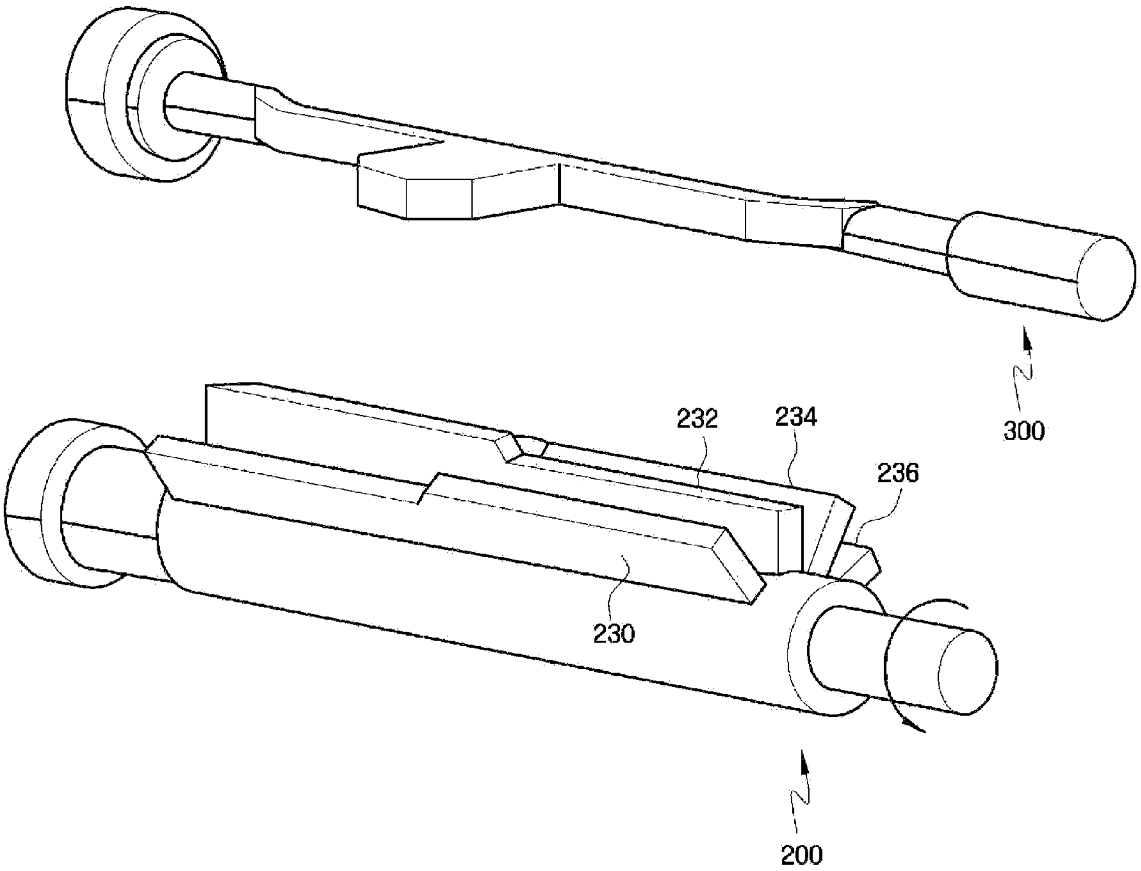

FIG. 6C shows the arrangement of the first shield 200 and the second shield 300 which generates the beam pattern of class C. The beam pattern of class C is generated by activating the second shield projection 232 of the first shield 200. The second shield projection 232 of the first shield 200 is activated by rotation of the first shield 200 so that the second shield projection 232 stands vertically. In this instance, the second shield 300 is not driven. Consequently, a part of the forwardly proceeding light is blocked by the second shield projection 232 to generate the beam pattern of class C.

Figure 6D:
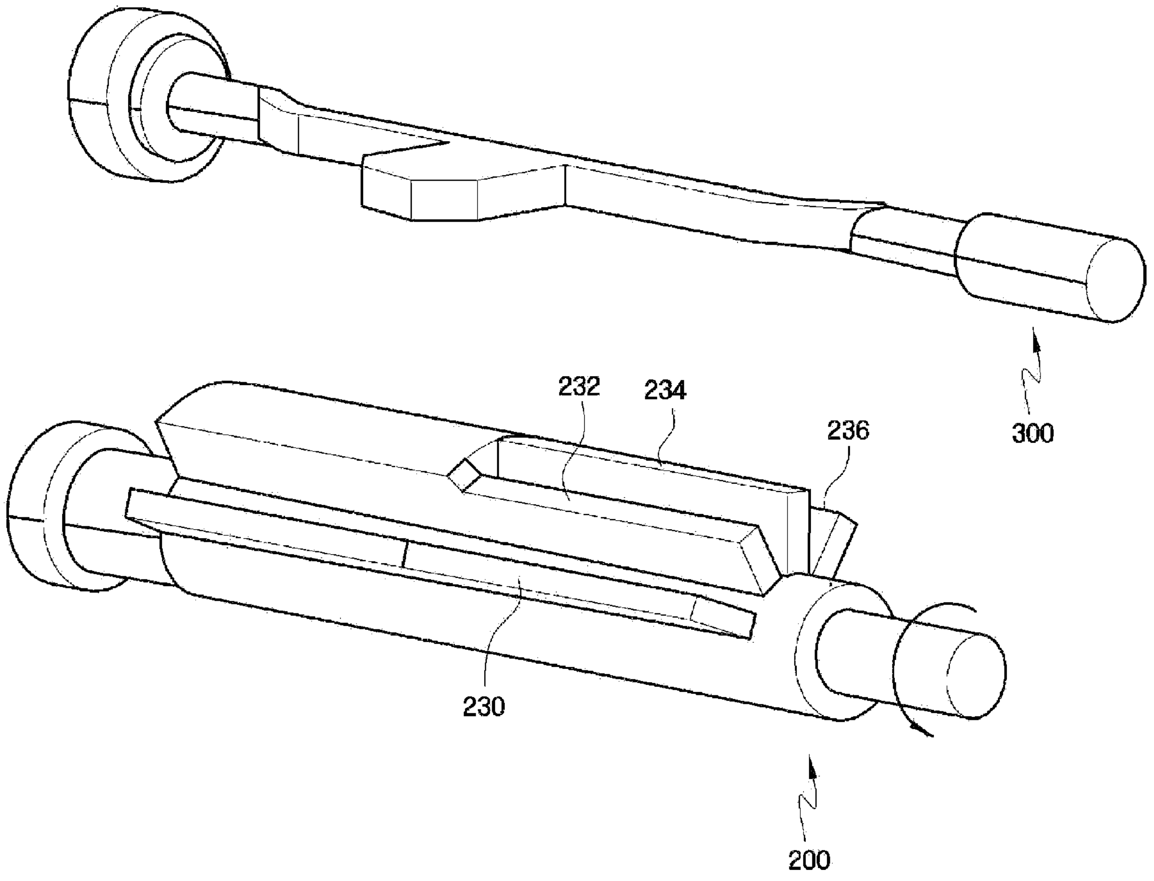

FIG. 6D shows the arrangement of the first shield 200 and the second shield 300 which generates the beam pattern of class V. The beam pattern of class V is generated by activating the third shield projection 234 of the first shield 200. The third shield projection 234 of the first shield 200 is activated by rotation of the first shield 200 so that the third shield projection 234 stand vertically. In this instance, the second shield 300 is not driven. Consequently, a part of the forwardly proceeding light is blocked by the third shield projection 234 to generate the beam pattern of class V.

Figure 6E:
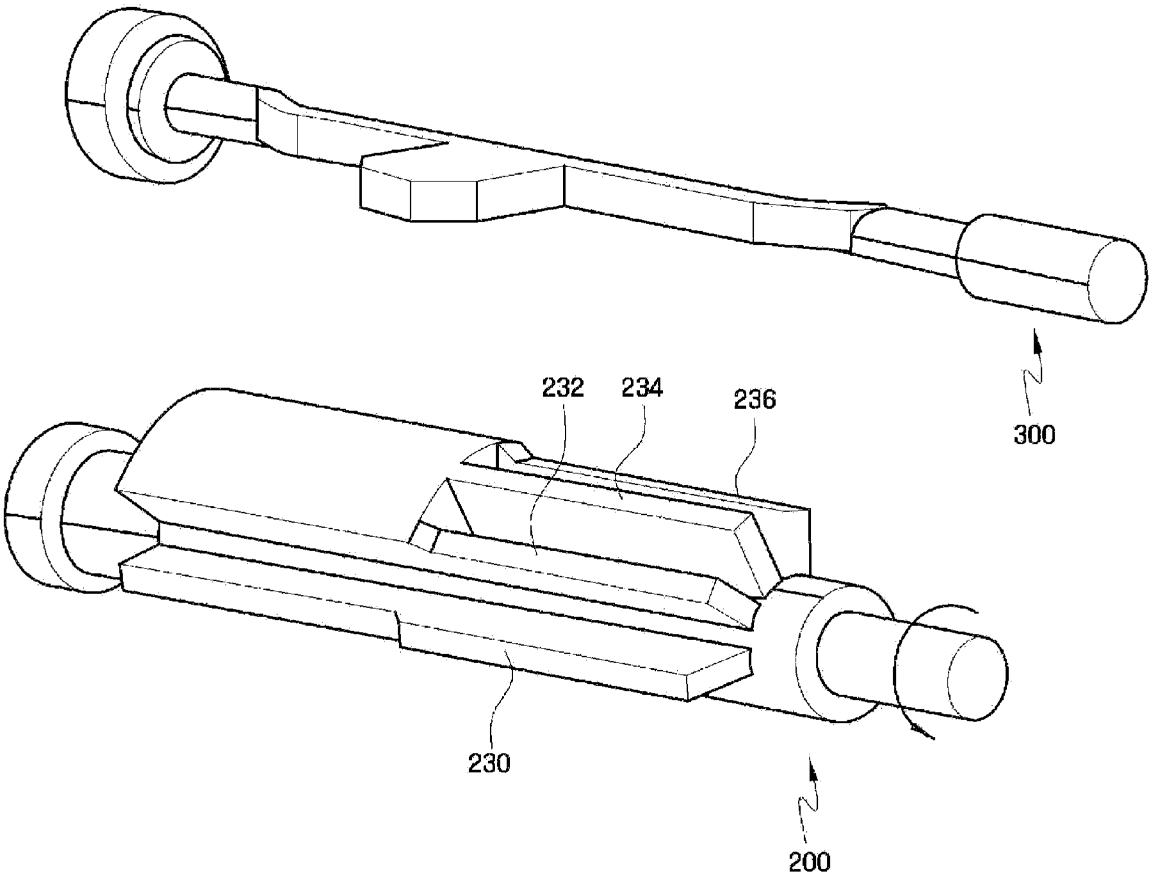

FIG. 6E shows the arrangement of the first shield 200 and the second shield 300 which generates the beam pattern of class E. The beam pattern of class E is generated by activating the fourth shield projection 236 of the first shield 200. The fourth shield projection 236 of the first shield 200 is activated by rotation of the first shield 200 so that the fourth shield projection 236 stands vertically. In this case, the second shield 300 is not driven. Consequently, a part of the forwardly proceeding light is blocked by the fourth shield projection 236 to generate the beam pattern of class E.

In FIG. 6A to FIG. 6E, the second shield 300 is not driven, and the first shield 200 is rotated to activate the respective shield projections 230, 232, 234 and 236 in accordance with the respective beam patterns to generate the beam pattern of classes H, RHD C, C, V and E. It is noted that rotation angle or angles of the first shield 200 may vary depending upon the arrangement of the shield projections on the first shield 200. For example, the first shield 200 can be rotated by 45° in a counterclockwise direction.

Figure 6F:
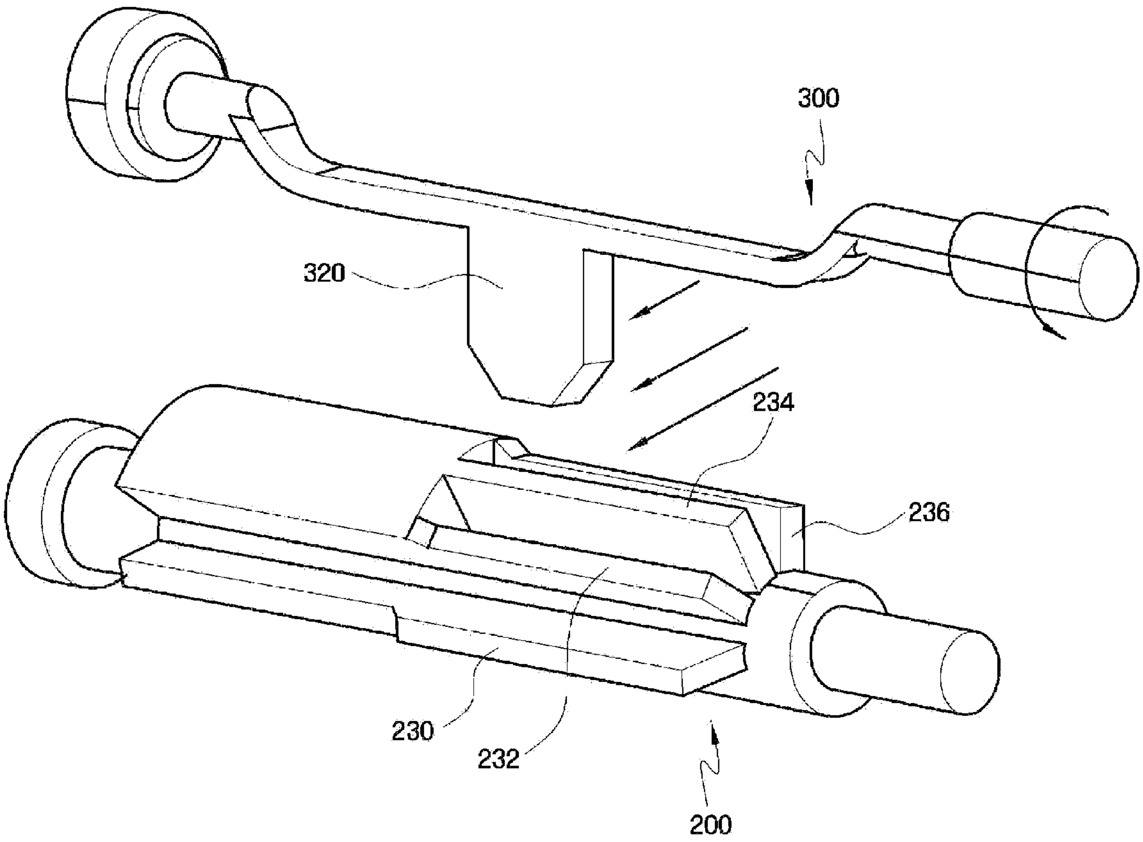

FIG. 6F shows the arrangement of the first shield 200 and the second shield 300 which generates the beam pattern of class W. In the case of the beam pattern of class W, the second shield 300 is driven. That is, the second shield 300 is rotated so as to hang down the shield plate 320 to interfere with a part of the light emitted from the lamp, thereby blocking a part of the forwardly proceeding light. In this case, the fourth shield projection 236 of the first shield 200 is activated. The beam patterns of class C and class W are more or less similar to each other, but in the case of class W, the second shield 300 is driven to reduce reflective glare in a close range.

In the case where the beam pattern of class E is generated, the first shield 200 is driven, while the second shield 300 is not driven. In the case where the beam pattern of class W, the first shield 200 is maintained in the same state as the case where the beam pattern of class E is generated, and the second shield 300 is driven. Consequently, a device for independently driving the first shield 200 and the second shield 300 is necessary. In particular, when converting from the beam pattern of class E to the beam pattern of class W, it is necessary to drive only the second shield 300 while the first shield 200 is stationary.

Figure 7A:
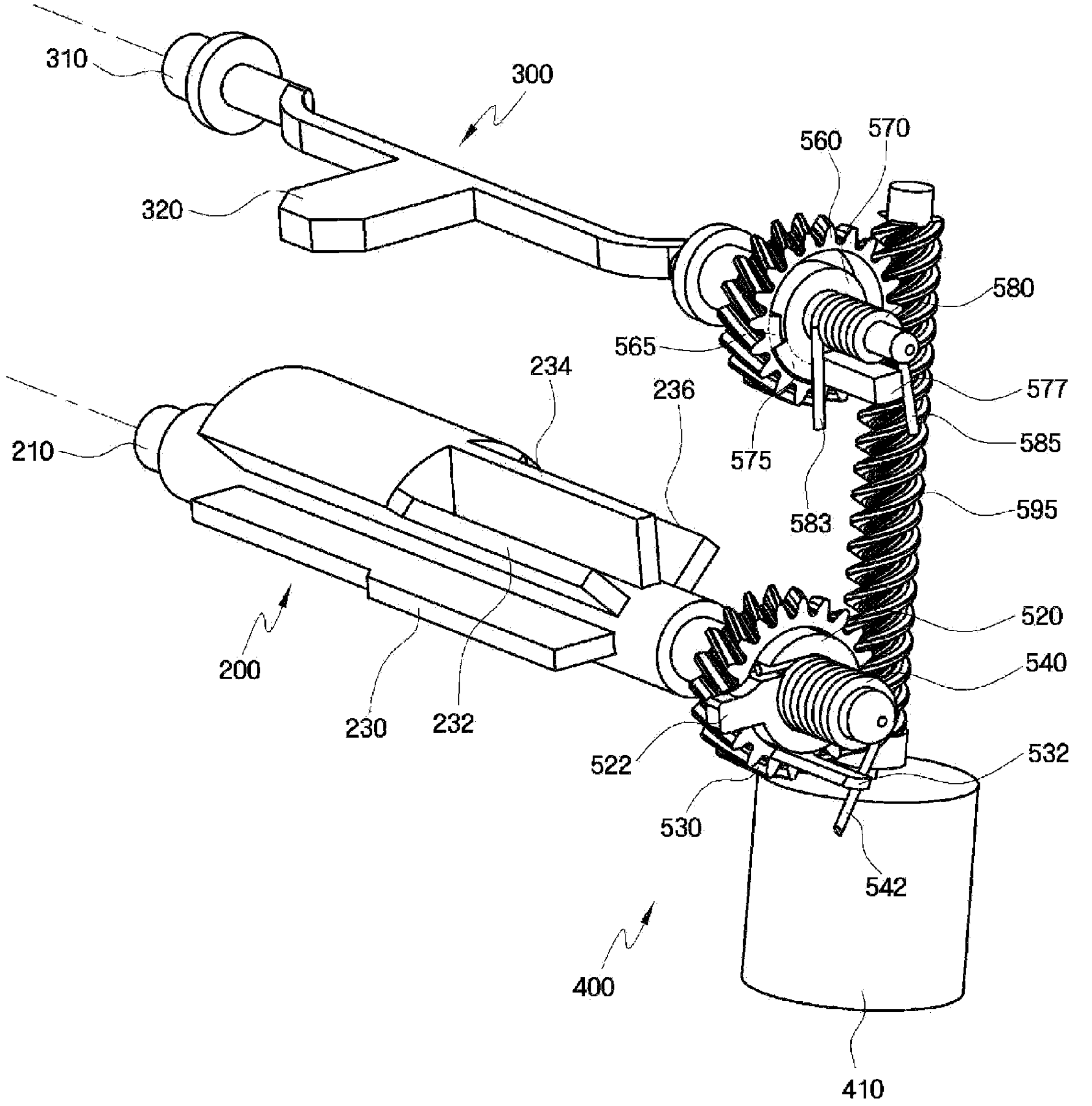
FIG. 7A is a perspective view illustrating a lamp shield driving device according to an embodiment of the present invention.
Figure 7B:
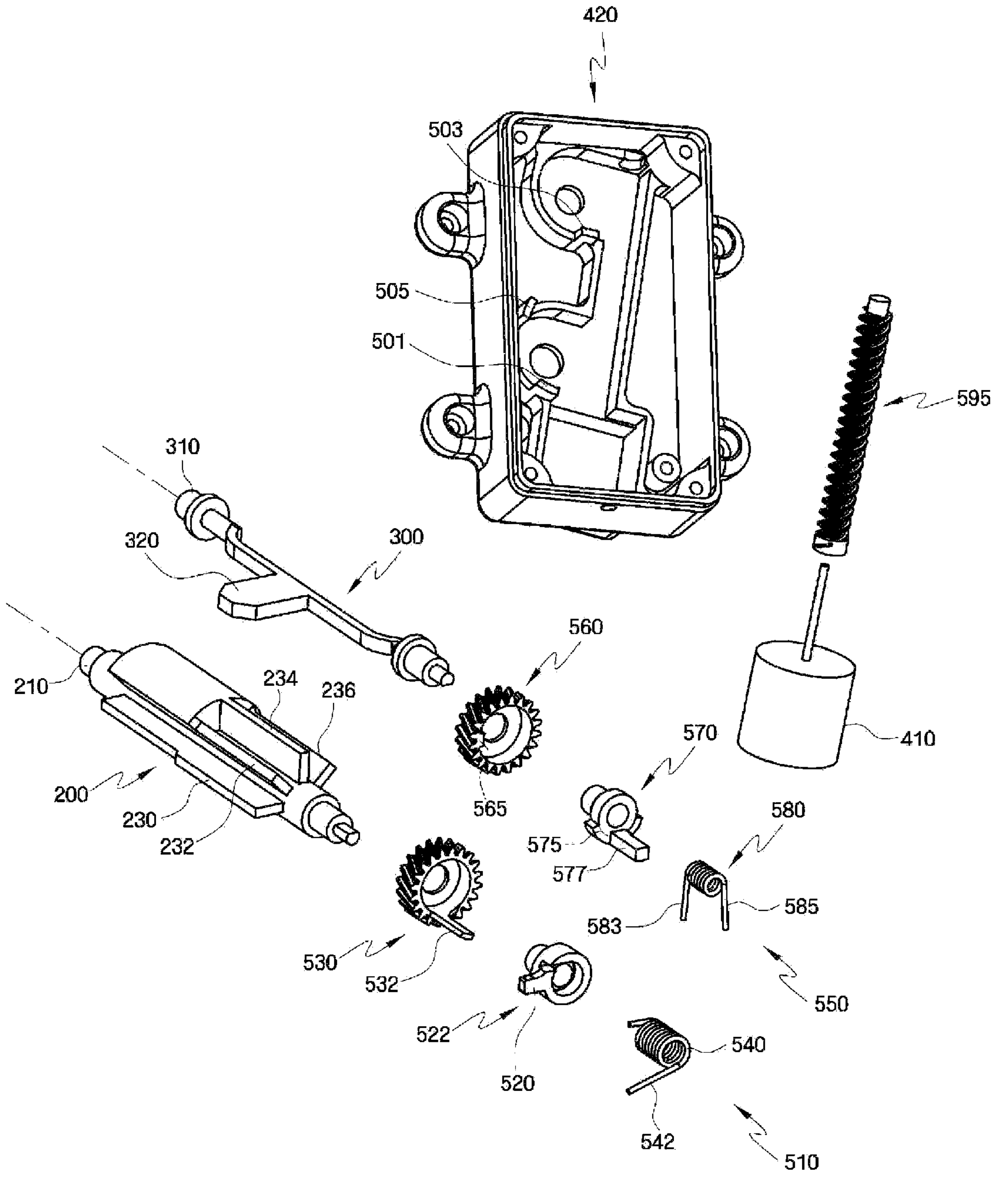
FIG. 7B is an exploded perspective view illustrating a lamp shield driving device according to an embodiment of the present invention.

FIG. 7A is a perspective view illustrating a lamp shield driving device according to an embodiment of the present invention, and FIG. 7B is an exploded perspective view illustrating the lamp shield driving device.

Referring to FIGS. 7A and 7B, the lamp shield driving device according to an embodiment of the present invention includes the first shield 200, the second shield 300 and a shield driving unit 400. Since the first shield 200 and the second shield 300 are described above, the shield driving unit 400 will now be described in detail.

The shield driving unit 400 includes a driving means and a driving gear unit. The driving means provides the driving gear unit with a driving force. As the driving means, for instance, a step motor 410 for allowing a user to rotate the driving gear unit by a wanted rotation angle may be used.

In general, the step motor 410 has an advantage of precisely controlling an angle in comparison with other AC or DC servo motors. The step motor 410 is adapted to convert a digital pulse applied from a digital source into mechanical shaft movement. The shaft of the motor is rotated by a predetermined angle in accordance with every pulse number, and a driving mode and a speed can thus be controlled by determination of a pulse interval. It is, however, noted that other driving devices, such as a servo motor, a linear motor and the like can be used.

Preferably, the driving gear unit includes a drive body 420, a first drive gear part 510, a second drive gear part 550 and a main gear part. The driving gear unit serves to drive the first shield 200 and the second 300 in order so as to generate various beam patterns.

The drive body 420 serves to support the driving means, the first drive gear part 510, the second drive gear part 550, and the main gear part. Suitably, the drive body 420 includes a first locking portion 501 for blocking rotation of the first shield 200 and a second locking portion 503 and a third locking portion 505 for blocking rotation of the second shield 300.

The first drive gear part 510 rotates the first shield 200. Preferably, it includes a first driven member 520, a first elastic member 540, and a first drive gear 530. The first driven member 520 is mounted on the rotation shaft 210 of the first shield 200, and thus is rotated together with the first shield 200. The first driven member 520 is provided with a first locking arm 522 protruding from the circumference thereof in a radius direction. In the case where the first locking arm 522 contacts against the first locking portion 501, the rotation of the first shield 200 is stopped.

The first elastic member 540 is mounted on the rotation shaft of the first shield 200, and thus is rotated together with the first shield 200. Otherwise, the first elastic member 540 may be fixed to the first driven member 520. The first elastic member 540 may have one leg 542 having a elastic force and attached to the first driven member 520. Even through the first shield 200 is stationary, when force is applied to the leg 542, the leg 542 is pushed rearward within a range of allowable resiliency.

The first drive gear 530 is mounted on the rotation shaft 210 of the first shield 200, with the first drive gear being not fixed. The first drive gear 530 is positioned adjacent to the first driven member 520. The first drive gear 530 can be rotated while being inserted to the first shield 200. Basically, the first drive gear 530 is rotated alone, but the first shield 200 is not rotated. The first drive gear 530 includes a first driving boss 532. While the first drive gear 530 is rotated, the first driving boss 532 can be locked by the leg 542 of the first elastic member 540. In this instance, the first driving boss 532 pushes the leg 542 of the first elastic member 540 to rotate the first shield 200 integrally coupled to the first elastic member 540.

In the case where the first shield 200 is locked by the first locking portion 501 to stop rotation of the first shield 200, the first drive gear 530 can be continuously rotated. The first driving boss 532 of the first drive gear 530 pushes the leg 542 of the first elastic member 540, but the first shield 200 is not rotated. Consequently, the leg 542 is pushed rearward within the range of allowable resilience of the leg 542. The operation of the first drive gear 510 will be described in detail hereinafter.

The second drive gear part 550 rotates the second shield 300. Preferably, the second drive gear part 550 comprises a second driven member 570, a second drive gear 560, and a second elastic member 540. The second driven member 570 is mounted on the rotation shaft 310 of the second shield 300, and is provided with a protrusion 575 formed on the circumference thereof. If the second driven member 570 is rotated, the second shield 300 coupled to the second driven member 570 is rotated. The protrusion 575 protrudes from a portion of the circumference to contact against a second driving boss 565 of the second drive gear 560, so that the second drive gear 560 is rotated around the circumference of the protrusion 575.

The second drive gear 560 is provided with teeth on the circumference thereof, and receives the second driven member 570 therein. The second drive gear 560 is not integrally attached to the second driven member 570, so that although the second drive gear 560 is rotated, the second driven gear 570 may not be rotated. The second drive gear 560 is provided with a second driving boss 565 formed on an inner periphery thereof. While the second drive gear 560 is rotated, the protrusion 575 of the second driven member 570 contacts against the second driving boss 565 to rotate the second driven member.

The second elastic member 580 is attached to the rotation shaft 310 of the second shield 300, and includes legs 583 and 585. The second elastic member 580 contacts against the second locking portion 503 of the drive body by the legs 583 and 585 to suppress rotation of the second shield 300. If the second driven member 570 is rotated, one leg 583 of the second elastic member 580 contacts against the second locking portion 503 of the drive body. As the second driven member 570 is rotated, the leg 585 is pushed rearward, with the other leg 585 contacting against a lateral arm 577 of the second driven member 570. The operation of the second drive gear part 550 will be described in detail hereinafter.

The main gear part is rotated by the driving force supplied from the driving means to transmit the power to the first drive gear part 510 and the second drive gear part 550. For example, the main gear part may include a lead screw 595 directly coupled to the rotation shaft of the step motor 401, teeth being formed on the long cylindrical circumference thereof. The lead screw 595 is an element which does not intersect with and in parallel to the rotations shafts of the first drive gear part 510 and the second drive gear part 550. The lead screw 595 is similar to a pinion, and may be referred to as a worm gear. When the cylinder of the lead screw 595 is rotated, the first drive gear 530 of the first drive gear part and the second drive gear 560 of the second drive gear part are rotated by the teeth formed on the cylinder.

FIGS. 8A to 8F are views illustrating the operation of the lamp shield driving device in accordance with the respective beam irradiating patterns.

Figure 8A:
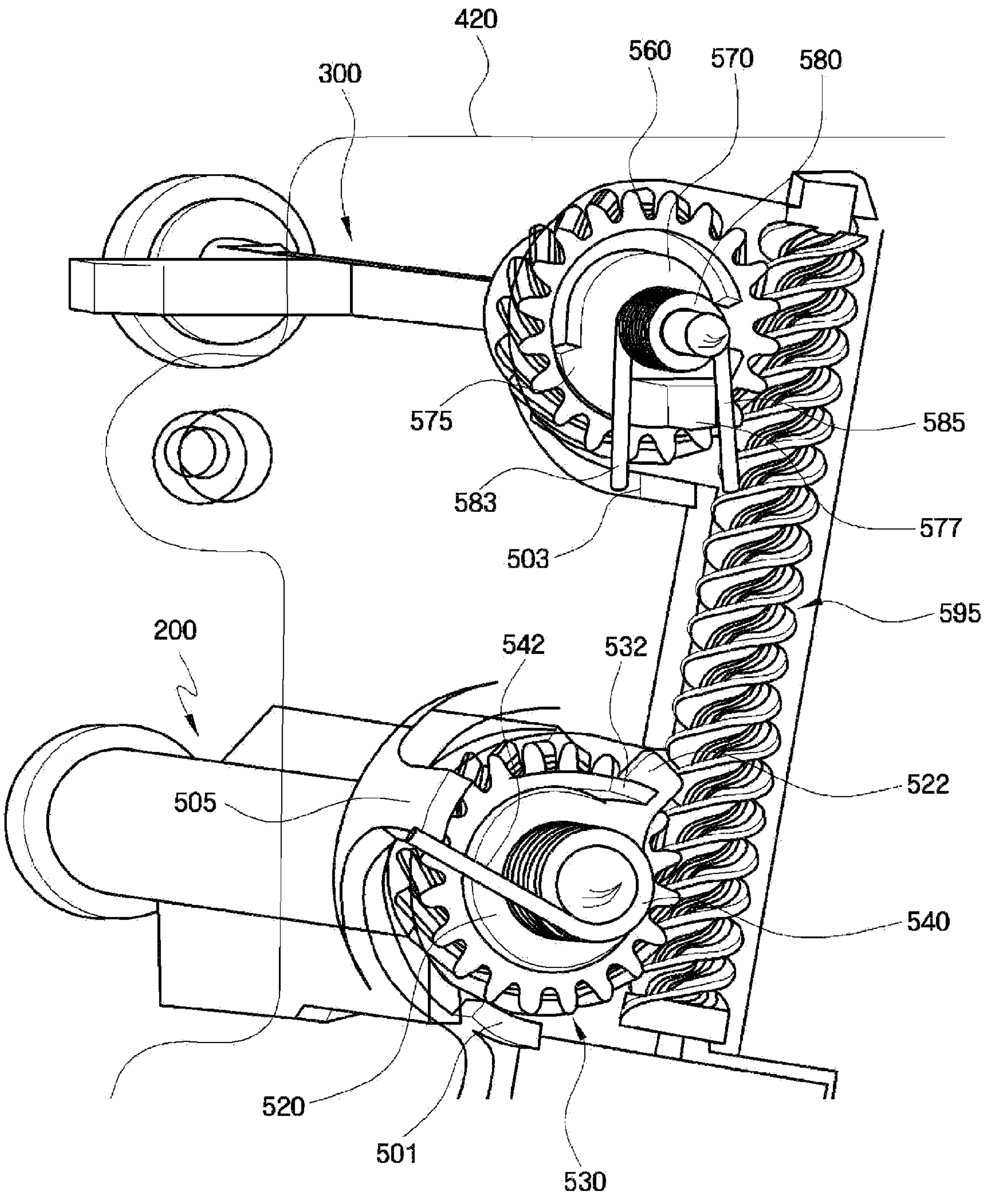
FIGS. 8A to 8F are views illustrating the operation of a lamp shield driving device in accordance with the respective beam irradiating patterns, according to an embodiment of the present invention.

FIG. 8A shows the operation of the lamp shield driving device to generate the beam pattern of class H. Explaining the operation of the shield driving unit 400, the leg 542 of the first elastic member 540 of the first drive gear part 510 contacts against the third locking portion 505 of the drive body, with the leg 542 being opened. In other words, the first elastic member has one leg 542 provided on the coil spring wound around the rotation shaft. The leg 542 shown in FIG. 8A is widely opened, and thus the elastic force is applied, in which a restoring force is acting on the leg 542. The first locking arm 522 of the first driven member 520 contacts against the first driving boss 532 of the first drive gear 530 to stop the first driven member 520 and the first shield 200 coupled to the first driven body.

The second drive gear part 550 stops the second drive member 570 and the second shield 300 coupled to the second driven member since two legs 583 and 585 of the second elastic member 580 contact against the second locking portion 503. Consequently, the arrangement of the first shield and the second shield generates the beam pattern of class H, as shown in FIG. 6A.

Figure 8B:
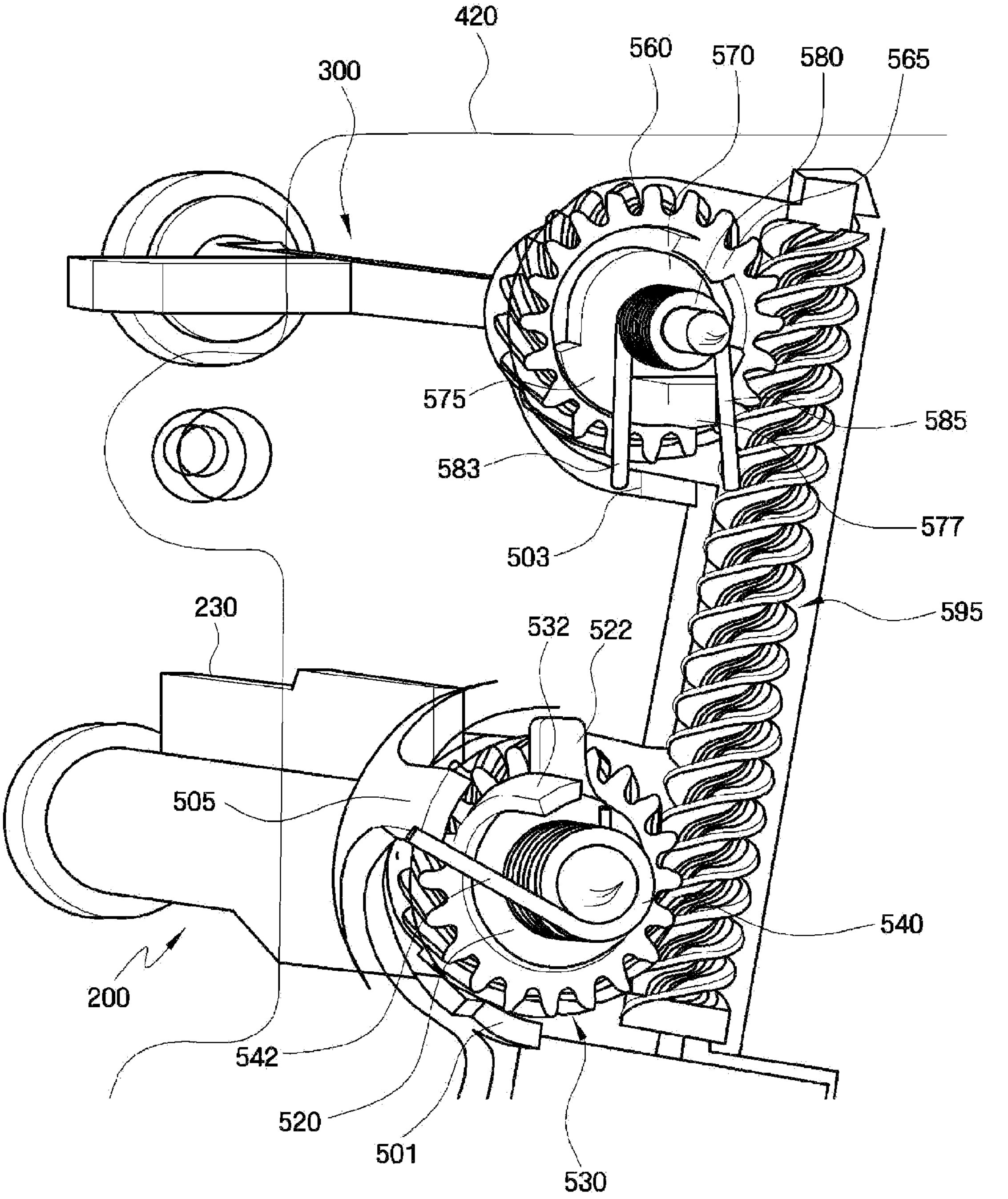

FIG. 8B shows the operation of the lamp shield driving device to generate the beam pattern of class RHD C. Explaining the operation of the shield driving unit 400, the first drive gear 530 and the second drive gear 560 are rotated at a certain angle by rotating the lead screw 595. For example, so as to activate the first shield projection 230 in the arrangement shown in FIG. 8A, the first drive gear 530 and the second drive gear 560 are rotated by an angle of 45° to rotate the first shield by an angle of 45°.

Since the first shield 200 and the second shield 300 are not coupled to the first drive gear 530 and the second drive gear 560 in a unit, the first shield and the second shield may not be rotated at once by rotation of the first drive gear 530 and the second drive gear 560.

The first drive gear 530 and the second drive gear 560 are rotated by an angle of 45°, so that only the first shield is rotated by an angle of 45° from the stop state. The operation thereof will now be described.

If the first drive gear 530 is rotated in a counterclockwise direction, the first driven member 520 can be rotated in a counterclockwise direction by the restoring force of the leg 542 of the first elastic member. Thus, the first shield 200 integrally coupled to the first driven member 520 is rotated. However, the first driven member 520 is rotated by the rotation angle of the first drive gear 530, so that the locking arm 522 of the first driven member 520 contacts against the first driving boss 532 to stop the rotation of the first driven member 520.

On the other hand, even though the second drive gear 560 is rotated in a counterclockwise direction by a certain angle, only the second drive gear 560 is rotated since the protrusion 575 of the second driven member 570 does not contact against the second driving boss 532.

Consequently, the lamp shield driving device rotates the first shield 200 to activate the first shield projection 230. As a result, the first shield is driven, and the second shield is not driven, thereby generating the beam pattern of class RHD C, as shown in FIG. 6B.

Figure 8C:
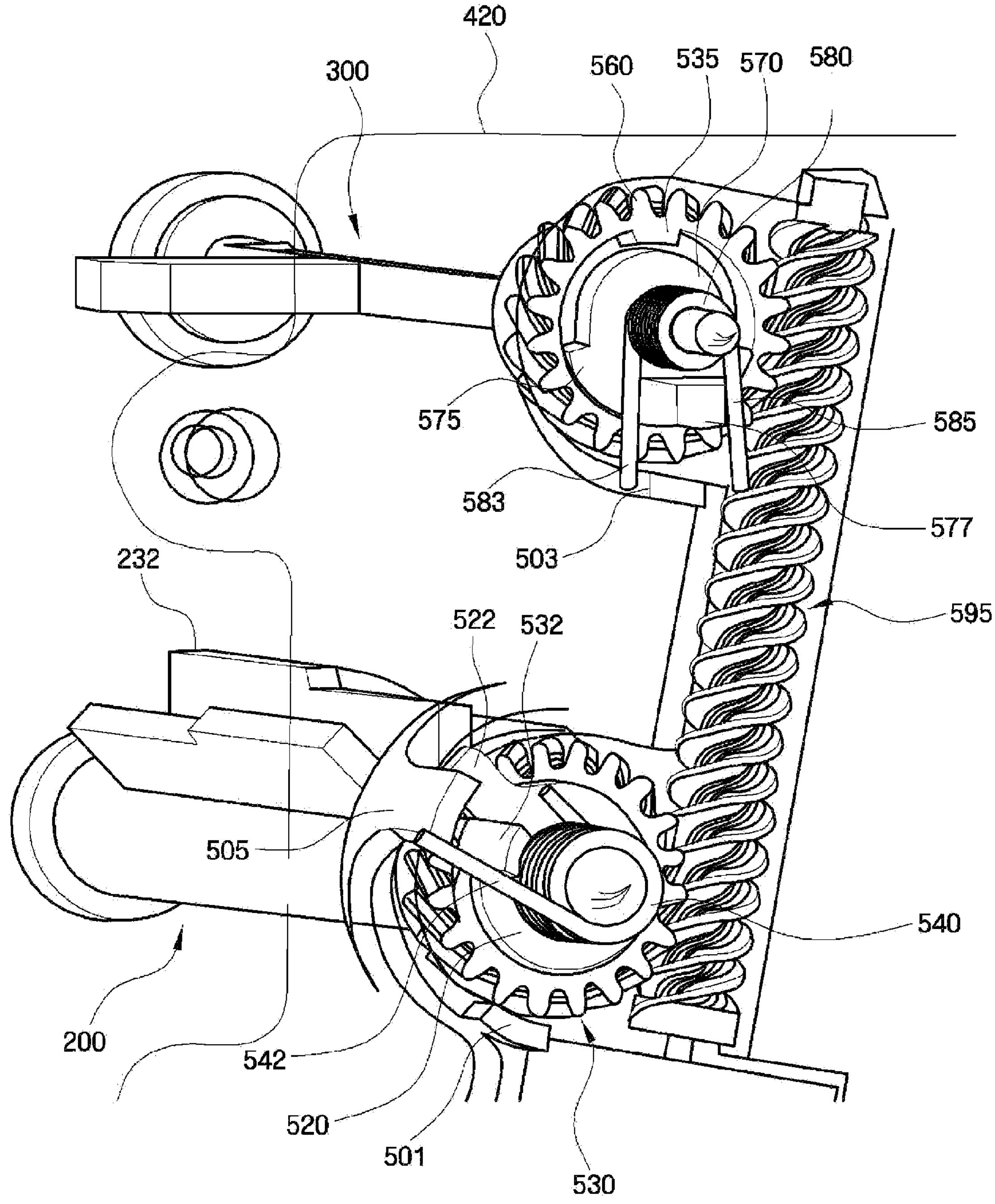

FIG. 8C shows the operation of the lamp shield driving device to generate the beam pattern of class C. Explaining the operation of the shield driving unit 400, the first drive gear 530 and the second drive gear 560 are rotated at a certain angle by rotating the lead screw 595 in the arrangement shown in FIG. 8B.

The first drive gear 530 is rotated in a counterclockwise direction, and thus the first driving boss 532 of the first drive gear 530 is rotated to the same position as the third locking portion 505 of the drive body. The first driven member 520 is rotated in a counterclockwise direction by the restoring force of the leg 542 of the first elastic member. The first shield 200 integrally coupled to the first driven member 520 is also rotated, so that the second shield projection 532 is activated by the rotation of the first shield 200 to generate the beam pattern of class C.

On the other hand, even though the second drive gear 560 is rotated in a counterclockwise direction by a certain angle, only the second drive gear 560 is rotated since the protrusion 575 of the second driven member 570 does not contact against the second driving boss 565.

Figure 8D:
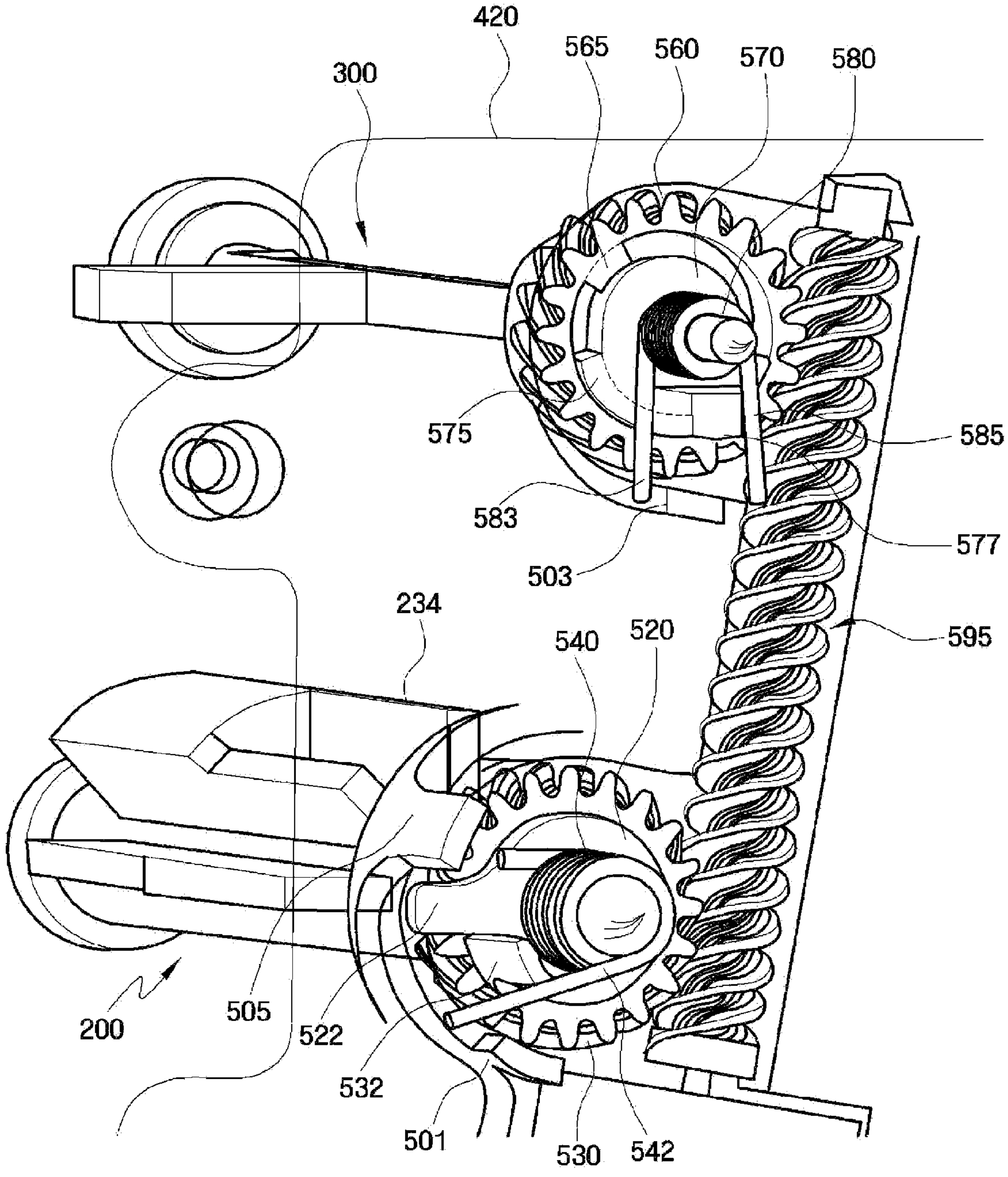

FIG. 8D shows the operation of the lamp shield driving device to generate the beam pattern of class V. Explaining the operation of the shield driving unit 400, the first drive gear 530 and the second drive gear 560 are rotated at a certain angle by rotating the lead screw 595 in the arrangement shown in FIG. 8C.

The first drive gear 530 is rotated in a counterclockwise direction, and thus the first driving boss 532 of the first drive gear 530 pushes the leg 542 of the first elastic member. Thus, the first drive gear 530 and the first elastic member 540 are rotated together, so that the first driven member 520 integrally coupled to the first elastic member 540 and the first shield 200 are rotated. The third shield projection 234 is activated by the rotation of the first shield 200 to generate the beam pattern of class V.

On the other hand, even though the second drive gear 560 is rotated in a counterclockwise direction by a certain angle, only the second drive gear 560 is rotated since the protrusion 575 of the second driven member 570 does not contact against the second driving boss 565.

Consequently, while the second shield 300 is not driven, the rotation of the first shield 200 generates the beam pattern of class V.

Figure 8E:
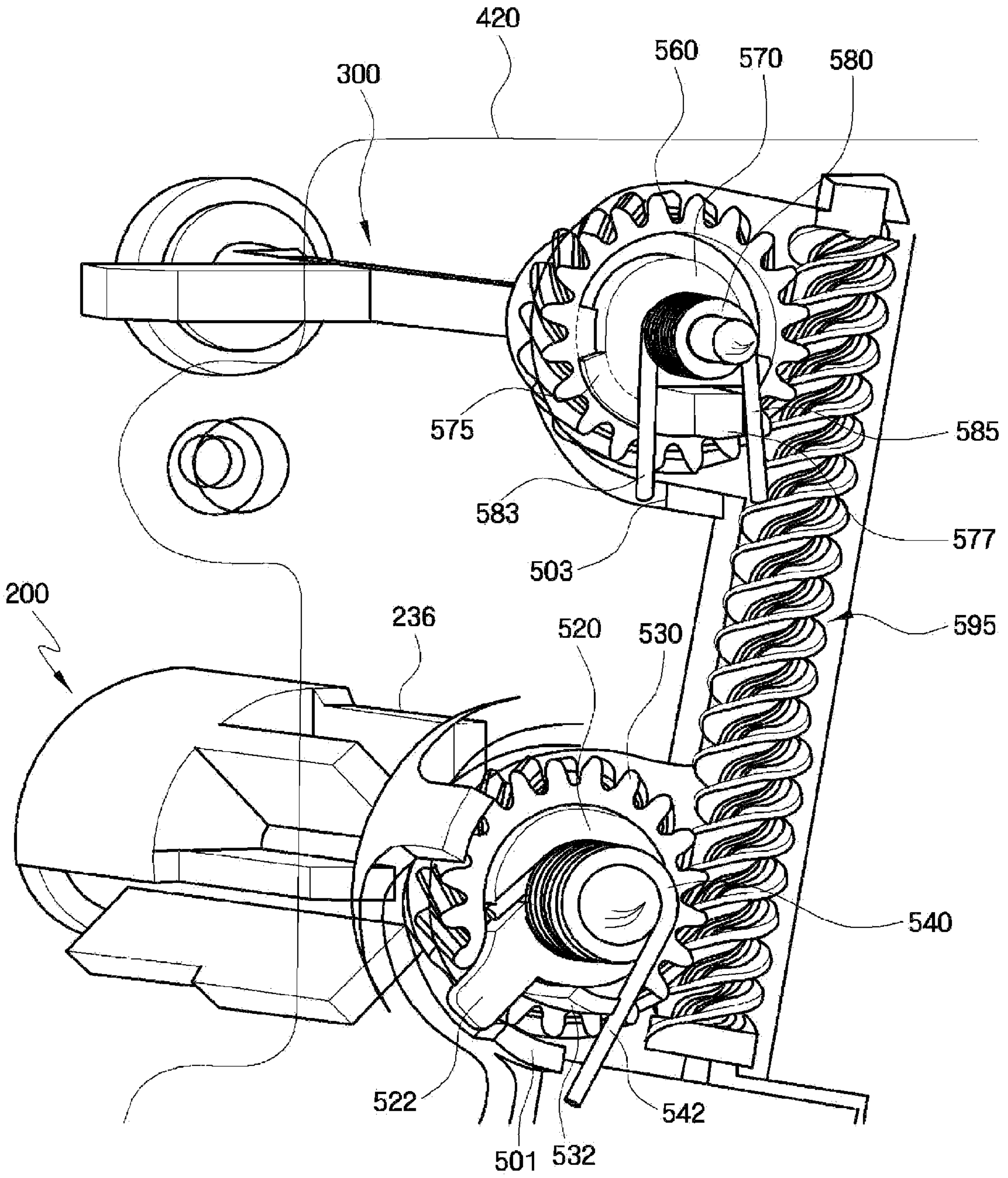

FIG. 8E shows the operation of the lamp shield driving device to generate the beam pattern of class E. Explaining the operation of the shield driving unit 400, the first drive gear 530 and the second drive gear 560 are rotated at a certain angle by rotating the lead screw 595 in the arrangement shown in FIG. 8D.

The first drive gear 530 is rotated in a counterclockwise direction, and thus the first driving boss 532 of the first drive gear 530 pushes the leg 542 of the first elastic member. Thus, the first drive gear 530 and the first elastic member 540 are rotated together, so that the first driven member 520 integrally coupled to the first elastic member 540 and the first shield 200 are rotated. The fourth shield projection 236 is activated by the rotation of the first shield 200 to generate the beam pattern of class E. After the rotation of the first shield 200, the first locking arm 522 of the first driven member 520 contacts against the first locking portion 501. As a result, the first shield 200 integrally coupled to the first driven member 520 cannot be further rotated.

On the other hand, even though the second drive gear 560 is rotated in a counterclockwise direction by a certain angle, only the second drive gear 560 is rotated since the protrusion 575 of the second driven member 570 does not contact against the second driving boss 565. Consequently, the second shield 300 is not driven.

The second shield 300 is not driven by the same operation principle as that shown in FIG. 8D, and the rotation of the first shield 200 generates the beam pattern of class E.

Figure 8F:
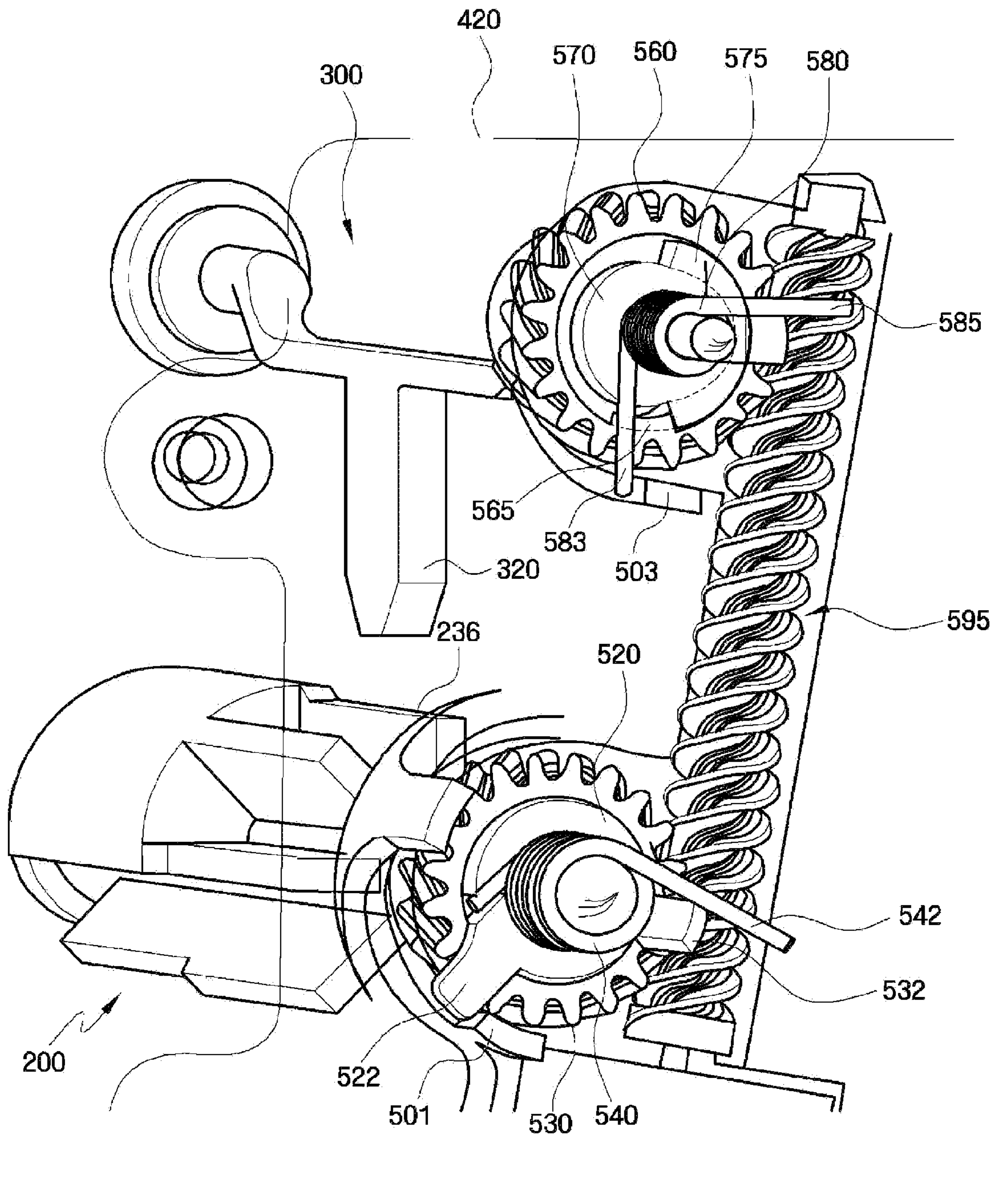

FIG. 8F shows the operation of the lamp shield driving device to generate the beam pattern of class W. Explaining the operation of the shield driving unit 400, the first drive gear 530 and the second drive gear 560 are rotated at a certain angle by rotating the lead screw 595 in the arrangement shown in FIG. 8E. For example, the first drive gear 530 and the second drive gear 560 are rotated in a counterclockwise direction by an angle of 90°.

Even though the first drive gear 530 is rotated in a counterclockwise direction, the first driven member 520 is not further rotated since the first locking arm 522 contacts against the first locking portion 501. Therefore, the first shield 200 is not further rotated. The first driving boss 532 of the first drive gear 530 is rotated while pushing the leg 542 of the first elastic member. The first driving boss 532 and the leg 542 of the first elastic member are maintained in the state where the first driving boss is rotated by a certain angle.

As the second drive gear 560 is rotated, the drive gear contacts against the protrusion 575 of the second driven member 570 to rotate the second driven member 570. Therefore, the second shield 300 integrally coupled to the second driven member 570 is also rotated, and the second shield plate 320 of the second shield is also rotated in a counterclockwise direction by an angle of 90° to block a part of the forwardly proceeding light. Consequently, while the first shield 200 is stopped, the second shield 300 is driven to generate the beam pattern of class W.

As described above, various beam patterns can be generated by driving the first shield and the second shield in order by using one driving source. Although the operation of the first shield 200 and the second shield 300 is described in order of classes H, RHD C, C, V, E and W, the beam patterns can be generated in order of classes W, E, V, C, RHD C and H by driving the shields reversely. Also, the beam patterns can be generated in order of classes RHD C and H on the basis of class C, or in order of classes V, E and W on the basis of class C. Although the first shield and the second shield are driven by using one driving source, various beam patterns can be generated by independently driving the first shield and the second shield.

The lamp shield driving device according to an embodiment of the present invention may include a fail safe mechanism which is returned to a reference position when the lamp shield driving device is malfunctioned or a specific beam pattern is generated.

For example, the lamp shield driving device can operate to convert the beam pattern of class H to a low beam pattern. The low beam pattern may be any one of classes RHD C, C, V and E. If a vehicle is traveling while maintaining the beam pattern of class H due to the malfunction or trouble of the shield driving device caused after the beam pattern of class H is generated, it can obstruct a visual field of a driver of an oncoming vehicle, which may cause a traffic accident. Therefore, it is necessary to covert the beam pattern of class H into a low beam pattern by using the shield driving device. Referring to FIGS. 8A and 8C, for example, the first driven member 520 and the first shield 200 are rotated by using the restoring force of the first elastic member 540 to convert the beam pattern of class H shown in FIG. 8A into the beam pattern of class C shown in FIG. 8C.

Also, it is possible to return the beam pattern of class W to the beam pattern of class E. Referring to FIG. 8E and FIG. 8F, for example, the second driven member 570 and the second shield 300 are rotated by using the restoring force of the second elastic member 580 to convert the beam pattern of class W shown in FIG. 8F into the beam pattern of class E shown in FIG. 8E. In this instance, the first drive gear 530 is rotated in a clockwise direction through the lead screw 595 driven by the clockwise rotation of the second drive gear 560. However, since the first driving boss 532 does not contact against the first locking arm 522, the beam pattern of class E can be generated while the first shield is not rotated. Although the operation of returning class W into class E is described, the beam pattern of class E may be any one of the beam patterns of classes C, V and E in accordance with the arrangement of the beam pattern prior to the conversion from the beam pattern of class E into the beam pattern of class W. Therefore, it is possible to return the beam pattern of class W to any one of beam patterns of classes C, V and E by using the fail safe mechanism of the shield driving device.

Figure 9:
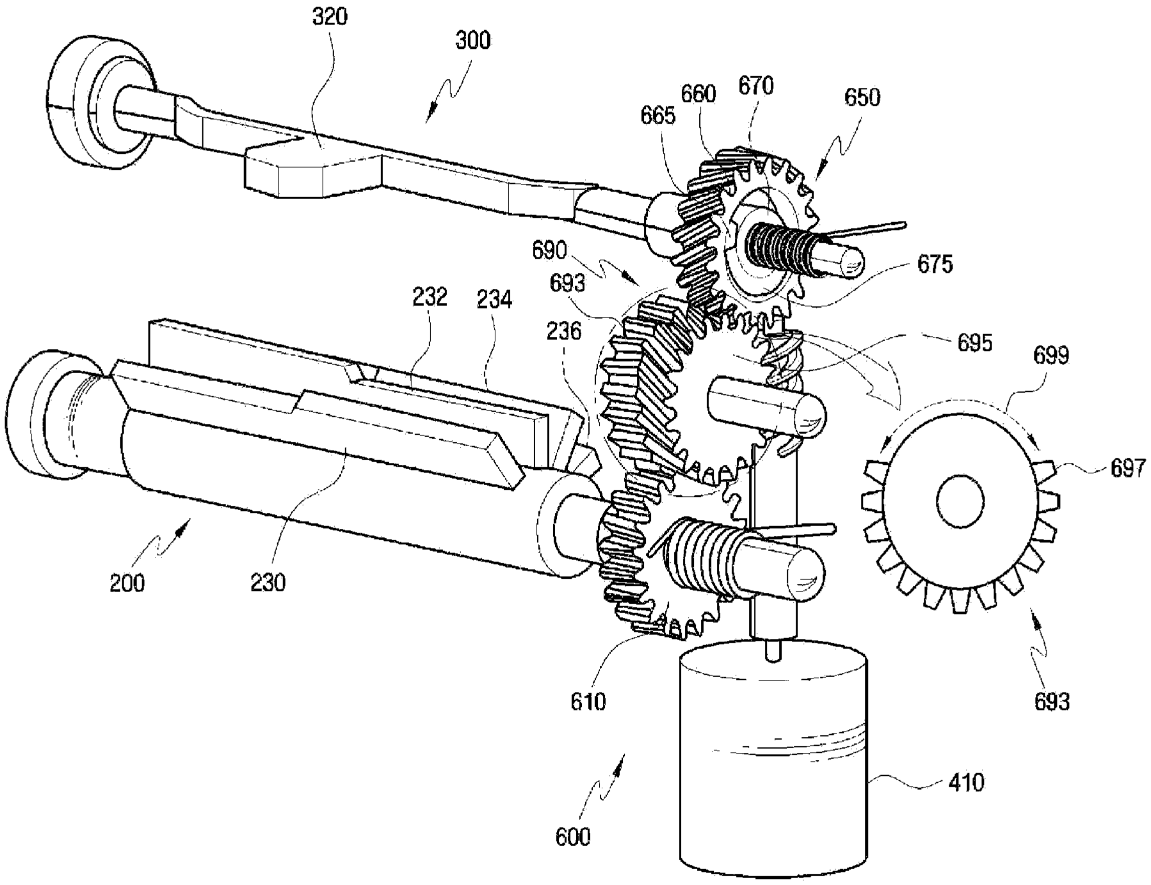
FIG. 9 is a perspective view illustrating a lamp shield driving device according to another embodiment of the present invention.

FIG. 9 is a perspective view illustrating a lamp shield driving device according to another embodiment of the present invention.

Referring to FIG. 9, the lamp shield driving device according to another embodiment includes a first shield 200, a second shield 300 and a shield driving unit 600. Since the first shield 200 and the second shield 300 have been described hereinbefore, the shield driving unit 600 will now be described in detail.

The shield driving unit 600 includes a driving means and a driving gear unit. The driving means provides the driving gear unit with a driving force. As the driving means, for instance, a step motor 410 for allowing a user to rotate a lead screw 595 by a wanted rotation angle may be used.

The driving gear unit includes a first drive gear part 610, a second drive gear part 650 and a main gear part 690. The first drive gear 610 is mounted on the rotation shaft 210 of the first shield 200, and may be provided with teeth on the circumference thereof. The first drive gear 610 may be provided with teeth of a spur gear on the circumference thereof. The first drive gear 610 is meshed with the main gear part 690 to rotate the first shield 200.

The second drive gear part 650 may include a second driven member 670 and a second drive gear 660. The second driven member 670 is mounted on the rotation shaft 310 of the second shield 300, and is provided with a protrusion 675 formed on the circumference thereof. The protrusion 675 protrudes from a portion of the circumference to contact against a driving boss 665 of the second drive gear 660, so that the second drive gear 660 is rotated around the circumference of the protrusion 675.

The second drive gear 660 receives the driven member 670 therein and rotates the driven member 670. The second drive gear 660 has teeth formed on the circumference thereof and a driving boss 665 formed on an inner periphery thereof to contact against the protrusion 675 of the driven member. Although the second drive gear 660 is rotated, the driven member 670 is not rotated at once since it is not integrally attached to the second drive bear 660. If the protrusion 675 of the driven member 670 contacts against the driving boss 665 of the second drive gear, the driven member 670 is rotated by the second drive gear 660 to rotate the second shield 300 which is integrally attached to the driven member 670.

The main gear part 690 may include a first main gear 693, a second main gear 695 and a lead screw 595. The first main gear 693 and the second main gear 695 are integrally engaged to each other, and thus are rotated at the same rotation rate. The first main gear 693 transmits the driving force to the first drive gear 610, while the second main gear 695 transmits the driving force to the second drive gear 660.

The first main gear 693 has teeth 697 formed on a portion of the circumference thereof. An idle region 699 having no teeth or having teeth smaller than those of other portion is provided on a portion of the circumference of the first main gear 693, the idle region being not meshed (engaged) with the first drive gear 610. The first main gear 693 is rotated to turn the first drive gear 610 in the region having the teeth 697. However, in the idle region 699, the first main gear 693 does not rotate the first drive gear 610. If the first drive gear 610 is not rotated, the first shield 200 integrally coupled to the first drive gear 610 is not rotated.

The second main gear 695 rotates the second drive gear 660 of the second drive gear unit 650. The second main gear 695 has teeth formed on the circumference which are meshed with the teeth of the second drive gear 660 to rotate the second drive gear 660. The second gear 695 is a helical gear, and the second drive gear 660 may be a helical gear which can be meshed with the second gear 695.

The lead screw 595 transmits the power to the second main gear 695. The lead screw 595 is rotated by a driving means, and the helical teeth of the lead screw 595 are meshed with the teeth of the second main gear to rotate the second main gear 695. Consequently, if the second main gear 695 is rotated by the driving means, the first main gear 694 integrally attached to the second main gear is also rotated to turn the first drive gear 610 and the second drive gear 660.

FIGS. 10A to 10F are views illustrating the operation of the lamp shield driving device according to another embodiment of the present invention.

Figure 10A:
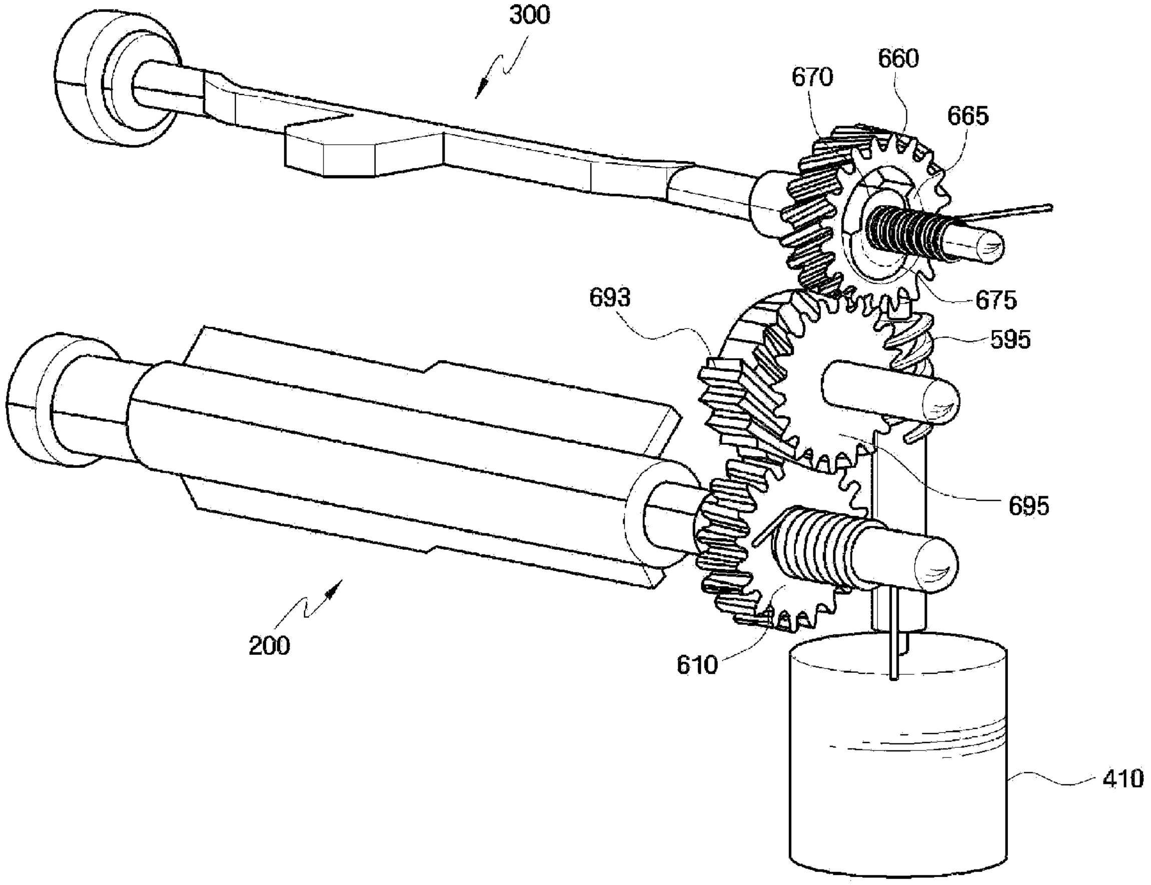
FIGS. 10A to 10F are views illustrating the operation of a lamp shield driving device in accordance with the respective beam irradiating patterns, according to another embodiment of the present invention.

FIG. 10A shows the operation of the lamp shield driving device to generate a beam pattern of a class H. Since the beam pattern of class H is a high beam, any of the shield projections of the first shield 200 is not activated, as shown in FIG. 6A, and the second shield 300 is horizontally positioned not to intercept the light. The light is not blocked by the first shield 200 to generate the beam pattern of class H.

Figure 10B:
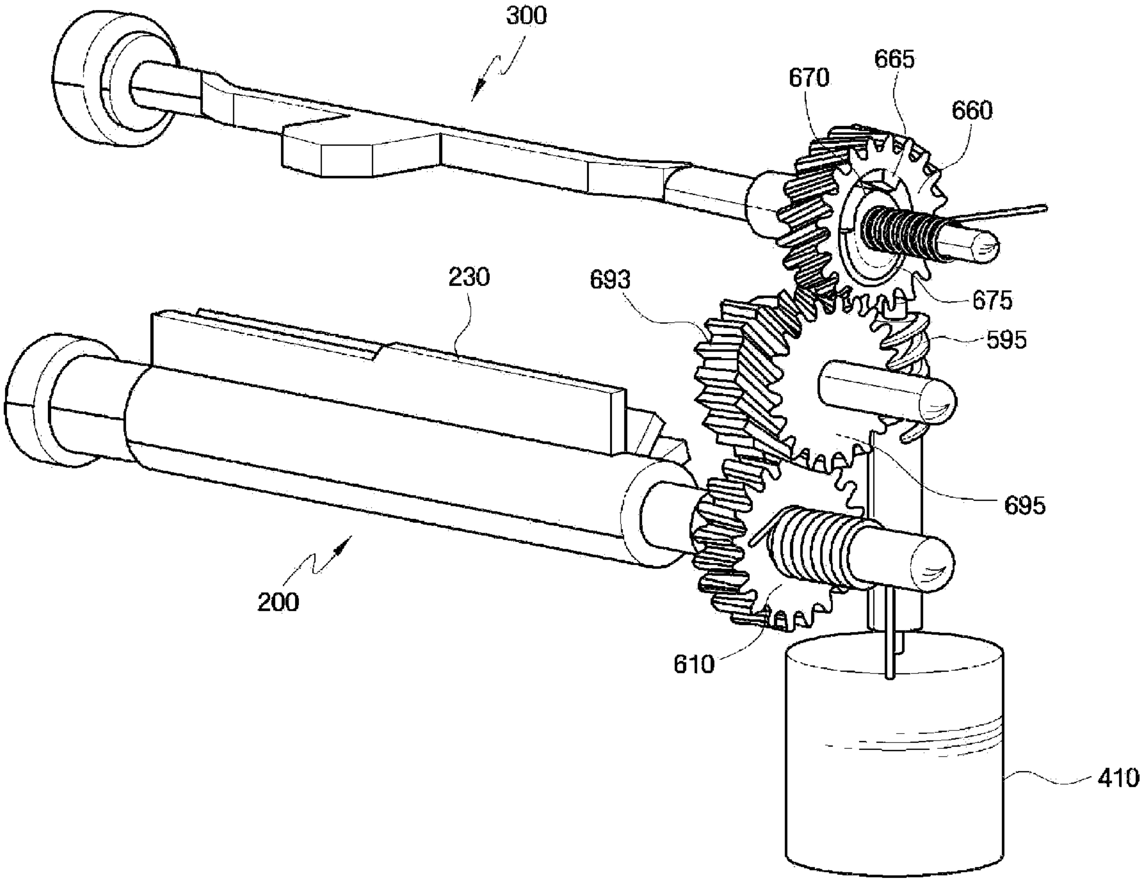

FIG. 10B shows the operation of the lamp shield driving device to generate a beam pattern of a class RHD C. Explaining the operation of the shield driving unit 600, the step motor 410 supplying a driving force in the arrangement shown in FIG. 10A and the lead screw 595 directly coupled to the step motor 410 are rotated to turn the first main gear 693 and the second main gear 695.

As the first main gear 693 is rotated, the first drive gear 610 meshed with the first main gear 693 is also rotated. As a result, if the first drive gear 610 is rotated, the first shield 200 integrally coupled to the first drive gear is also rotated. The rotation of the first shield 200 causes the first shield projection 230 to activate to generate the beam pattern of the RHD C.

Meanwhile, since the second main gear 695 is meshed with the first main gear 693, the second main gear is rotated at the same rotation angle as that of the first main gear. The second main gear 695 is meshed with the second drive gear 660 to rotate the second drive gear 660. Since the driving boss 665 formed on the inner periphery of the second drive gear 660 does not contact against the protrusion 675 formed on the circumference of the driven member 670, only the second drive gear 660 is rotated. Consequently, the driven member 670 and the second shield 300 integrally coupled to the driven member are not rotated, so that the second shield 300 is not driven.

As described above, while the second shield 300 is not driven, the first shield 200 is rotated, thereby activating the first shield boss 230 and thus generating the beam pattern of class RHD C.

Figure 10C:
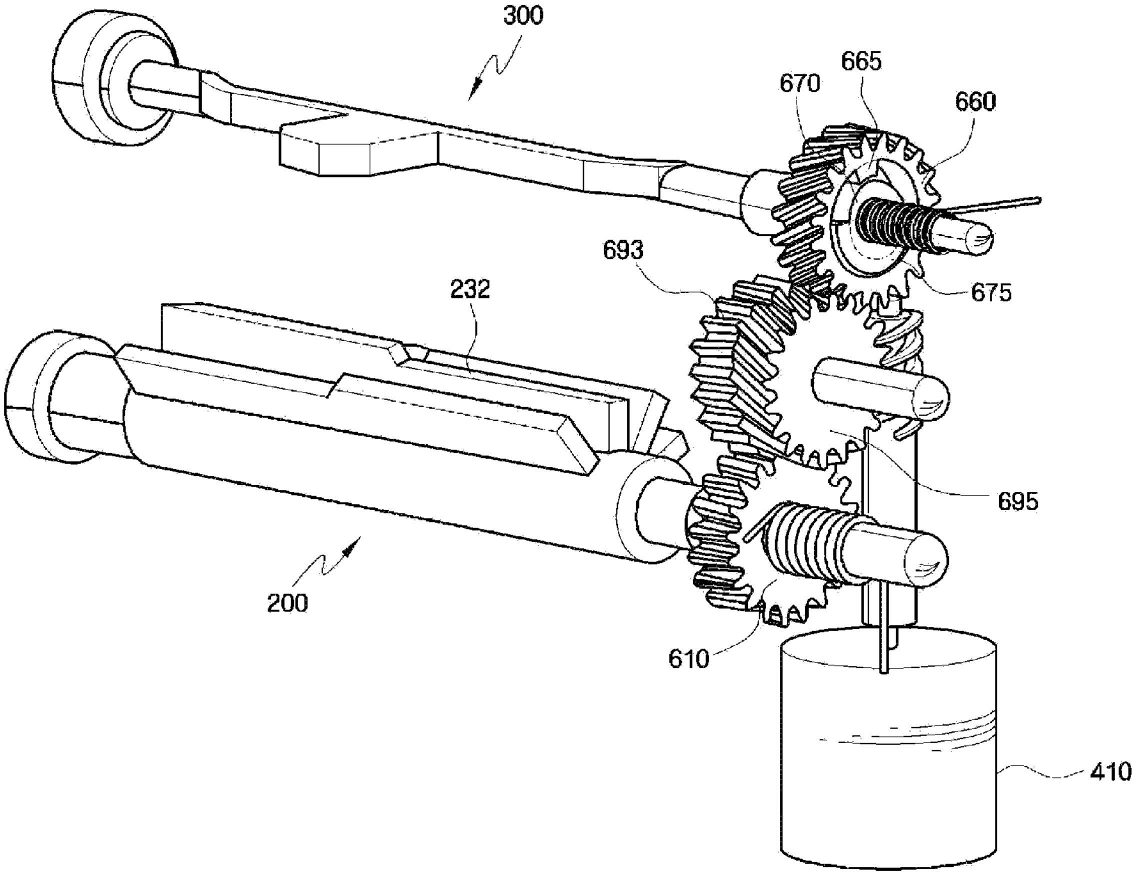

FIG. 10C shows the operation of the lamp shield driving device to generate a beam pattern of a class C. Explaining the operation of the shield driving unit 600, the step motor 410 supplying a driving force in the arrangement shown in FIG. 10A and the lead screw 595 directly coupled to the step motor 410 are rotated to turn the first main gear 693 and the second main gear 695.

The first drive gear 610 is rotated by the rotation of the first main gear 693, and the first shield 200 is also rotated by the first drive gear 610. The rotation of the first shield 200 causes the second shield projection 232 to activate to drive the first shield 200.

The second drive gear 660 is rotated by the rotation of the second main gear 695. Although the second drive gear 660 is rotated, the second shield is not driven since the driving boss 665 of the second drive gear 660 does not contact against the protrusion 675 of the driven member 670.

Consequently, the second shield projection 232 of the first shield 200 is activated, and the second shield 300 is not driven, thereby generating the beam pattern of class C.

Figure 10D:
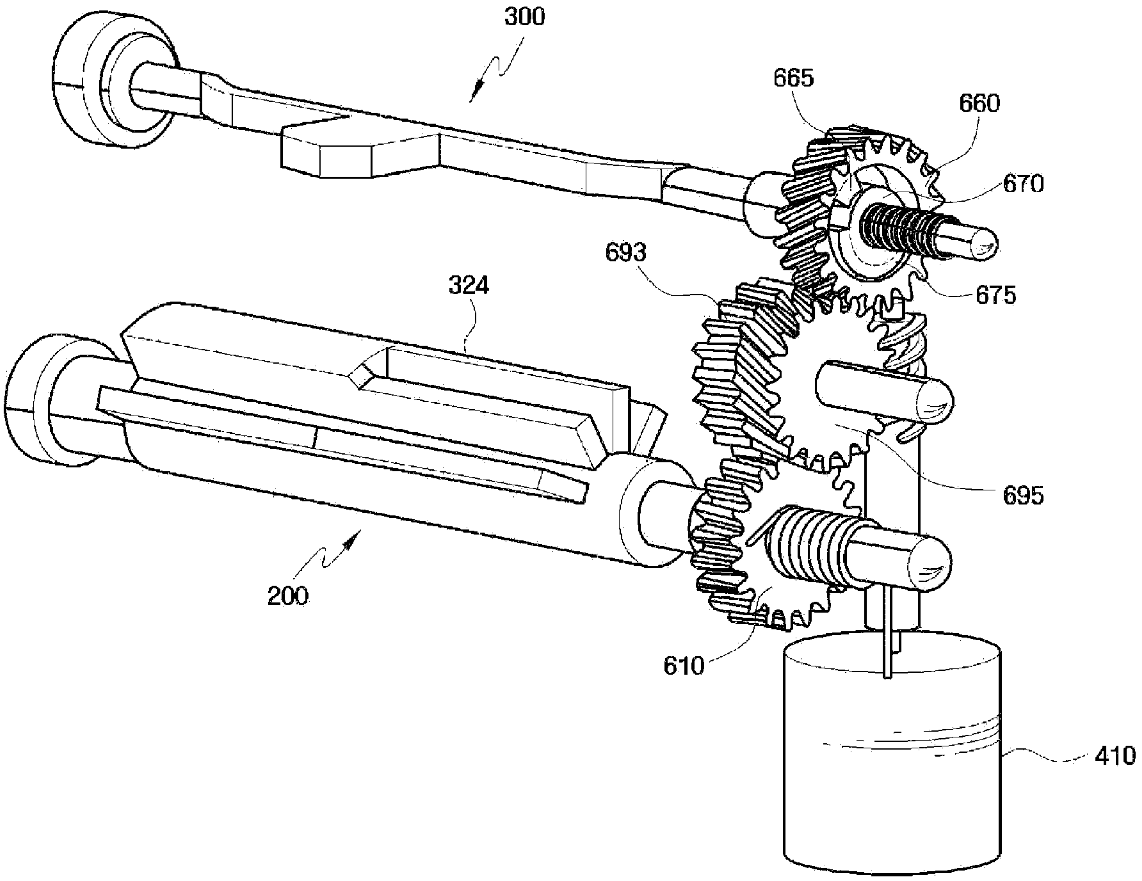

FIG. 10D shows the operation of the lamp shield driving device to generate a beam pattern of a class V. The first shield 200 is rotated by the same operation as that shown in FIG. 10C, but the second shield 300 is not rotated. Consequently, the first shield 200 is driven by the third shield projection 234, and the second shield 300 is not driven. The first shield 200 and the second shield 300 are disposed as shown in FIG. 6D to generate the beam pattern of class V.

Figure 10E:
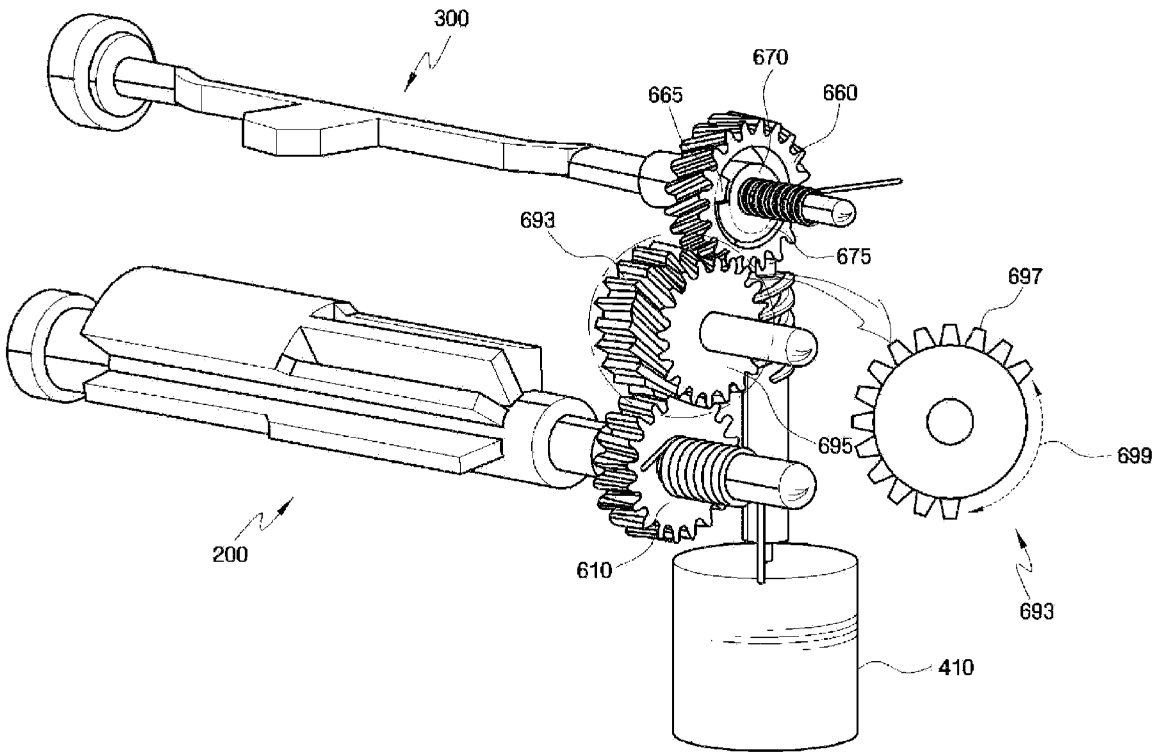

FIG. 10E shows the operation of the lamp shield driving device to generate a beam pattern of a class E. The first shield 200 is rotated by the same operation as that shown in FIG. 10C, but the second shield 300 is not rotated. Consequently, the first shield 200 is driven by the fourth shield projection 236, and the second shield 300 is not driven. The first shield 200 and the second shield 300 are disposed as shown in FIG. 6E to generate the beam pattern of class E.

Figure 10F:
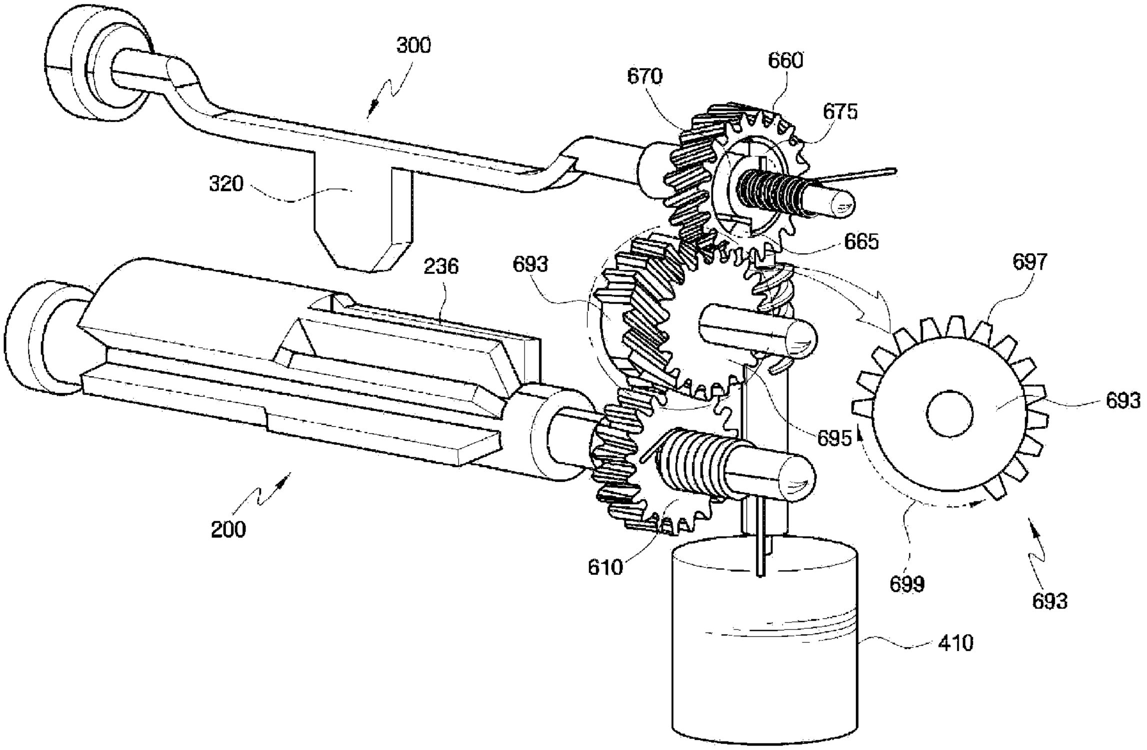

FIG. 10F shows the operation of the lamp shield driving device to generate a beam pattern of a class W. Explaining the operation of the shield driving unit 600, the step motor 410 supplying a driving force in the arrangement shown in FIG. 10A and the lead screw 595 directly coupled to the step motor 410 are rotated to turn the first main gear 693 and the second main gear 695.

Teeth 697 are formed on a portion of the first main gear 693. The first drive gear 610 is not rotated in the idle region 699 of the first main gear 693, even though the first main gear 693 is rotated. That is, while the first main gear 693 is rotated, the first drive gear 610 is not rotated since the teeth of the first drive gear 610 corresponds to the portion of the first main gear 693 which has no teeth. Consequently, since the first drive gear 610 is not rotated, the first shield 200 is not rotated, thereby maintaining the fourth shield projection 236 in an activating state.

On the other hand, the second drive gear 660 rotated by the second main gear 695 rotates the driven member. Since the driving boss 665 formed on the inner periphery of the second drive gear 660 contacts against the protrusion 675 of the driven member 670, the driven member 670 is rotated by the rotation of the second drive gear 660. The second shield 300 is also rotated by the rotation of the driven member 670, and the shield plate 320 of the second shield 300 is vertically lowered to drive the second shield 300.

In the state where the fourth shield projection 236 of the first shield is activated, the second shield 300 is driven to generate the beam pattern of class W. In other words, the first shield and the second shield are independently operated by one driving unit to effectively generate the beam pattern of class W.

In FIG. 10A to FIG. 10E, the operation of the shield driving unit 600 in the lamp shield driving device in accordance with various beam patterns is described hereinbefore. The shield driving unit 600, which comprises one driving source, can generate various beam patterns by operating the first shield 200 and the second shield 300. In particular, while the first shield is stationary, the second shield is driven in order to easily generate the beam pattern of class W.

Similarly, although the operation of the first shield 200 and the second shield 300 is described in order of classes H, RHD C, C, V, E and W, the beam patterns can be generated in various orders. For example, they can be generated in order of classes W, E, V, C, RHD C and H by driving the shields reversely. Also, the beam patterns can be generated in order of classes RHD C and H on the basis of class C, or in order of classes V, E and W on the basis of class C.

Figure 11:
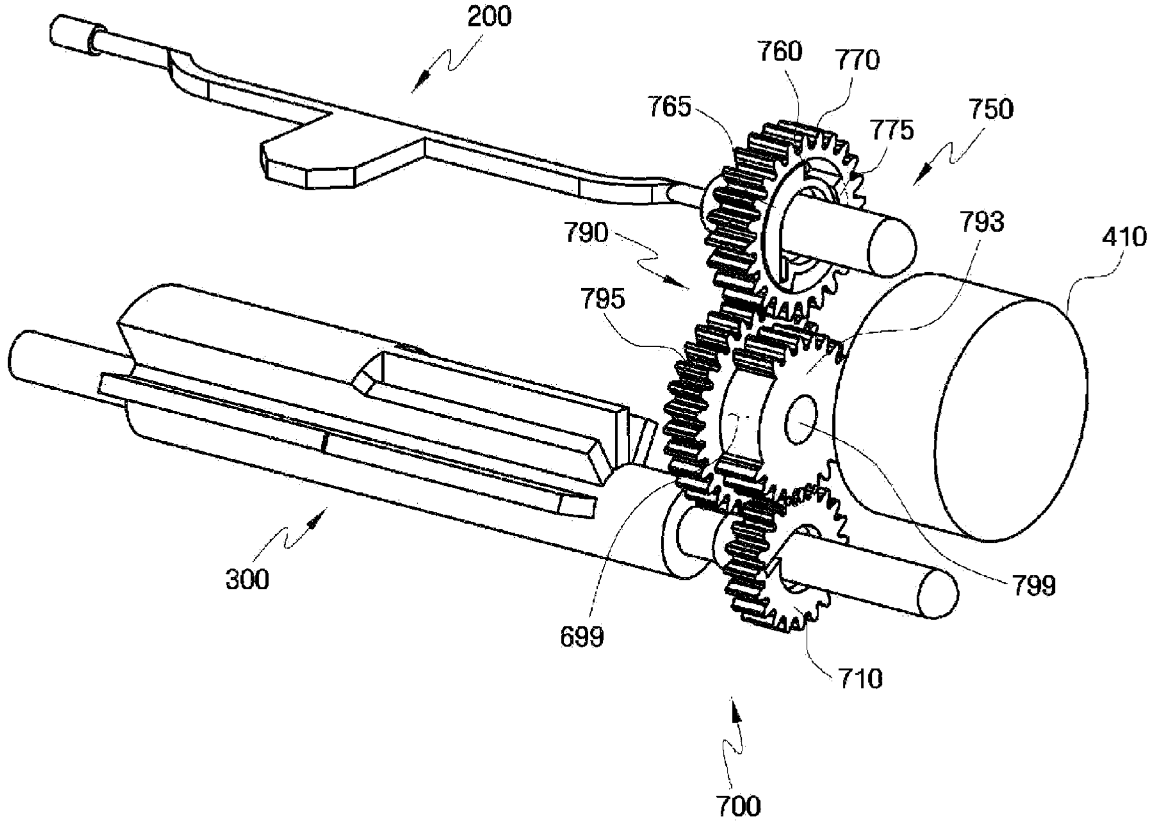
FIG. 11 is a perspective view illustrating a lamp shield driving device according to still another embodiment of the present invention.

FIG. 11 is a perspective view illustrating a lamp shield driving device according to still another embodiment of the present invention.

Referring to FIG. 11, the lamp shield driving device according to still another embodiment includes a first shield 200, a second shield 300 and a shield driving unit 700. Since the first shield 200 and the second shield 300 have been described hereinbefore, the shield driving unit 700 will now be described in detail with respect to the difference between the shield driving unit 700 and the shield driving unit 600 shown in FIG. 9.

The shield driving unit 700 includes a driving means and a driving gear unit. The driving gear unit includes a first drive gear part 710, a second drive gear part 750 and a main gear part 790.

The first drive gear 710 is a spur gear, and is mounted on the rotation shaft 210 of the first shield 200. The second drive gear part 750 has a driven member 770 attached to the rotation shaft 310 of the second shield 300 and a second drive gear 760 enclosing the driven member 770 and having teeth formed on the circumference thereof. The second drive gear 760 is a spur gear, and has a driving boss 765 contacting against a protrusion 775 of the driven member to rotate the driven member 770.

The main gear part 790 includes a first main gear 793 and a second main gear 795. The first main gear 793 and the second main gear 795 are integrally engaged to each other, and have the same rotation shaft 799. The driving means is directly coupled to the rotation shaft 799 of the first main gear 793 and the second main gear 795 to rotate the first main gear 793 and the second main gear 795.

The first main gear 793 rotates the first drive gear 710, while the second main gear 795 rotates the second drive gear 760. Teeth 797 is formed on only a portion of the first main gear 793, so that the first drive gear 710 is not rotated in the region having no teeth. That is, the first shield 200 is not rotated in the idle region 699.

The first drive gear 710 and the second drive gear 760 are rotated by the main gear part 790 to drive the first shield 200 and the second shield 300. The shield drive unit 700 can generate various beam patterns by the sequential operation of the first shield 200 and the second shield 300 described with reference to FIGS. 10A to 10F.

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A lamp shield driving device for an adaptive headlamp assembly to generate a plurality of beam patterns, comprising:

a first shield including at least one shield projection formed on a circumference thereof, the first shield being rotated around a first rotation shaft;

a second shield to shield at least a part of beam irradiation, the second shield being rotated around a second rotation shaft, the first and second rotation shafts being separately mounted and spaced apart from each other in the lamp shield driving device; and a shield driving unit to drive the first shield and the second shield in a sequential order to thereby generate a certain beam pattern;

wherein the shield driving unit includes driving means for supplying a driving force, and a drive gear part to transmit the driving force to the first rotation shaft and the second rotation shaft to rotate the first shield and the second shield.

2. The lamp shield driving device of claim 1, wherein the drive gear part comprises:

a drive body including a first locking portion to block rotation of the first shield and a second locking portion to block rotation of the second shield;

a first drive gear part to rotate the first shield;

a second drive gear part to rotate the second shield; and a main gear part to transmit the driving force to the first drive gear part and the second drive gear part;

wherein, while the first shield is stopped by the first locking portion, the second shield is rotated by the second drive gear part.

3. The lamp shield driving device of claim 2, wherein the first drive gear part comprises:

a first driven member mounted on the first rotation shaft of the first shield and including a first locking arm formed on a circumference thereof;

a first elastic member mounted on the first rotation shaft of the first shield and including a leg; and a first drive gear to rotate the first elastic member to thereby rotate the first shield;

wherein, when the first shield is rotated by the first drive gear, the first locking arm of the first driven member contacts against the first locking portion to stop rotation of the first shield.

4. The lamp shield driving device of claim 2, wherein the second drive gear part comprises:

a second driven member mounted on a second rotation shaft of the second shield and including a protrusion formed on a circumference thereof; and a second drive gear including a second driving boss to rotate the second driven member case where the second driving boss contacts against the protrusion of the second driven member.

5. The lamp shield driving device of claim 4, wherein the second drive gear part comprises a second elastic member mounted on the second rotation shaft of the second shield, and including two legs; and wherein the second locking portion is positioned between the two legs of the second elastic member for blocking rotation of the second shield.

6. The lamp shield driving device of claim 2, wherein the main gear part is a lead screw connected to the driving means and having teeth formed on a circumference thereof to transmit the driving force to the first drive gear part and the second drive gear part.

7. The lamp shield driving device of claim 1, wherein the driving gear part comprises:

a first drive gear part mounted on the first shield and including teeth formed on a circumference thereof;

a second drive gear part to rotate the second shield; and a main gear part to transmit the driving force from the driving means to the first drive gear part and the second drive gear part;

wherein, when the first shield is not rotated, the second shield is rotated by the second drive gear part, and when the second shield is not rotated, the first shield is rotated by the first drive gear part.

8. The lamp shield driving device of claim 7, wherein the second drive gear part comprises:

a second driven member mounted on the second shield and including a protrusion formed on a circumference thereof; and a second drive gear including a driving boss to rotate the driven member when the driving boss contacts against the protrusion of the driven member.

9. The lamp shield driving device of claim 8, wherein the second drive gear part further comprises an elastic portion to temporarily fix the second shield when the second shield is not rotated.

10. The lamp shield driving device of claim 7, wherein the main gear part comprises:

a first main gear to transmit the driving force to the first drive gear and including teeth formed on a portion of a circumference thereof; and a second main gear to transmit the driving force to the second drive gear part;

wherein the first main gear and the second main gear are integrally engaged to each other and are rotated together.

11. The lamp shield driving device of claim 10, wherein the first main gear is a spur gear and the second main gear is a helical gear or a spur gear.

12. The lamp shield driving device of claim 10, wherein the main gear part further comprises a lead screw including teeth formed on a circumference thereof which is meshed with the second main gear to rotate the second main gear and the first main gear.

13. An adaptive headlamp assembly comprising:

a lamp;

a lamp shield driving device to shield at least a part of light emitted from the lamp in a certain shield pattern; and a housing receiving the lamp and the lamp shield driving device;

wherein the lamp shield driving device comprises:

a first shield including at least one shield projection formed on a circumference thereof, the first shield being rotated around a first rotation shaft;

a second shield to shield at least a part of beam irradiation, the second shield being rotated around a second rotation shaft, the first and second rotation shafts being separately mounted and spaced apart from each other in the lamp shield driving device; and a shield driving unit to drive the first shield and the second shield in a sequential order to thereby generate a certain beam pattern by using one driving source;

wherein the shield driving unit includes driving means for supplying a driving force and a drive gear part to transmit the driving force from the driving means to the first rotation shaft and the second rotation shaft to rotate the first shield and the second shield.

14. The adaptive headlamp assembly of claim 13, wherein the driving means includes a step motor to control a rotation angle of the drive gear part by the driving force.

15. The adaptive headlamp assembly of claim 13, further comprising a rotation support supporting the first and second rotation shafts of the first shield and the second shield.

* * * * *